C. H. HOWARD.
BAG FILLING MACHINE.
APPLICATION FILED OCT. 26, 1918.
1,425,481.
Patented Aug. 8, 1922.
15 SHEETS—SHEET 1.
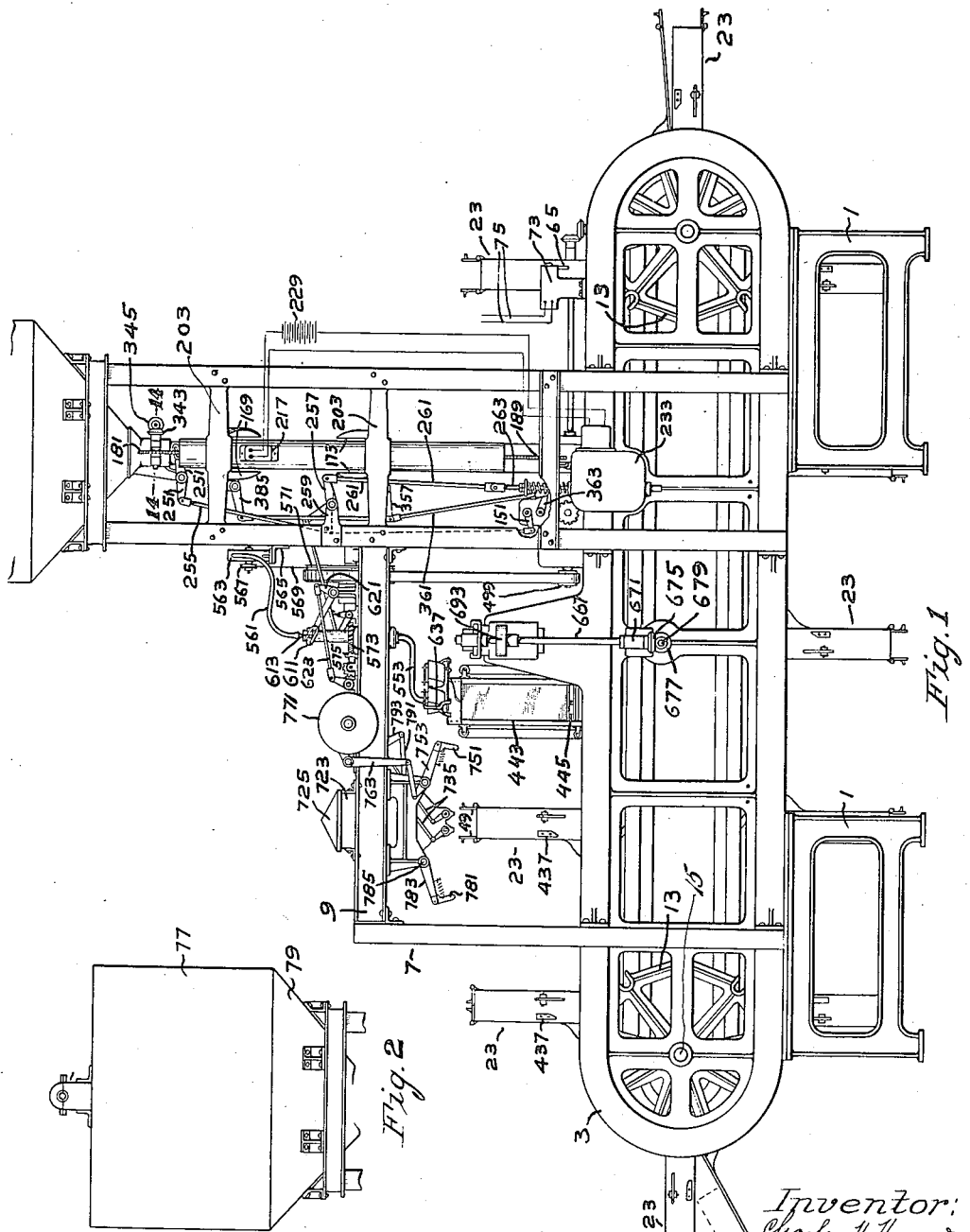

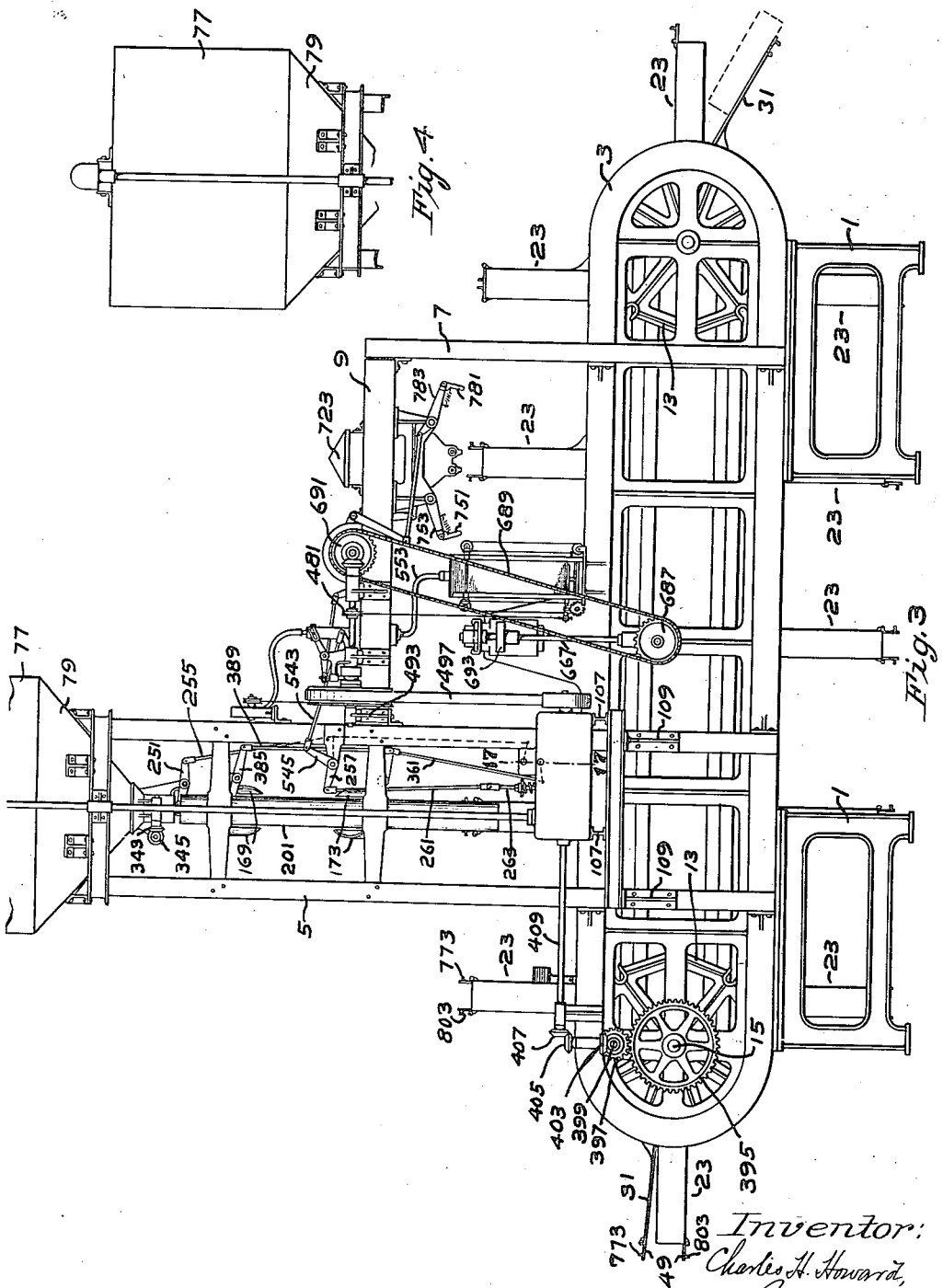

C. H. HOWARD.
BAG FILLING MACHINE.
APPLICATION FILED OCT. 26, 1918.

1,425,481.

Patented Aug. 8, 1922.
15 SHEETS—SHEET 3.

Inventor;
Charles H. Howard,
by Robt. P. Hains.
Attorney;

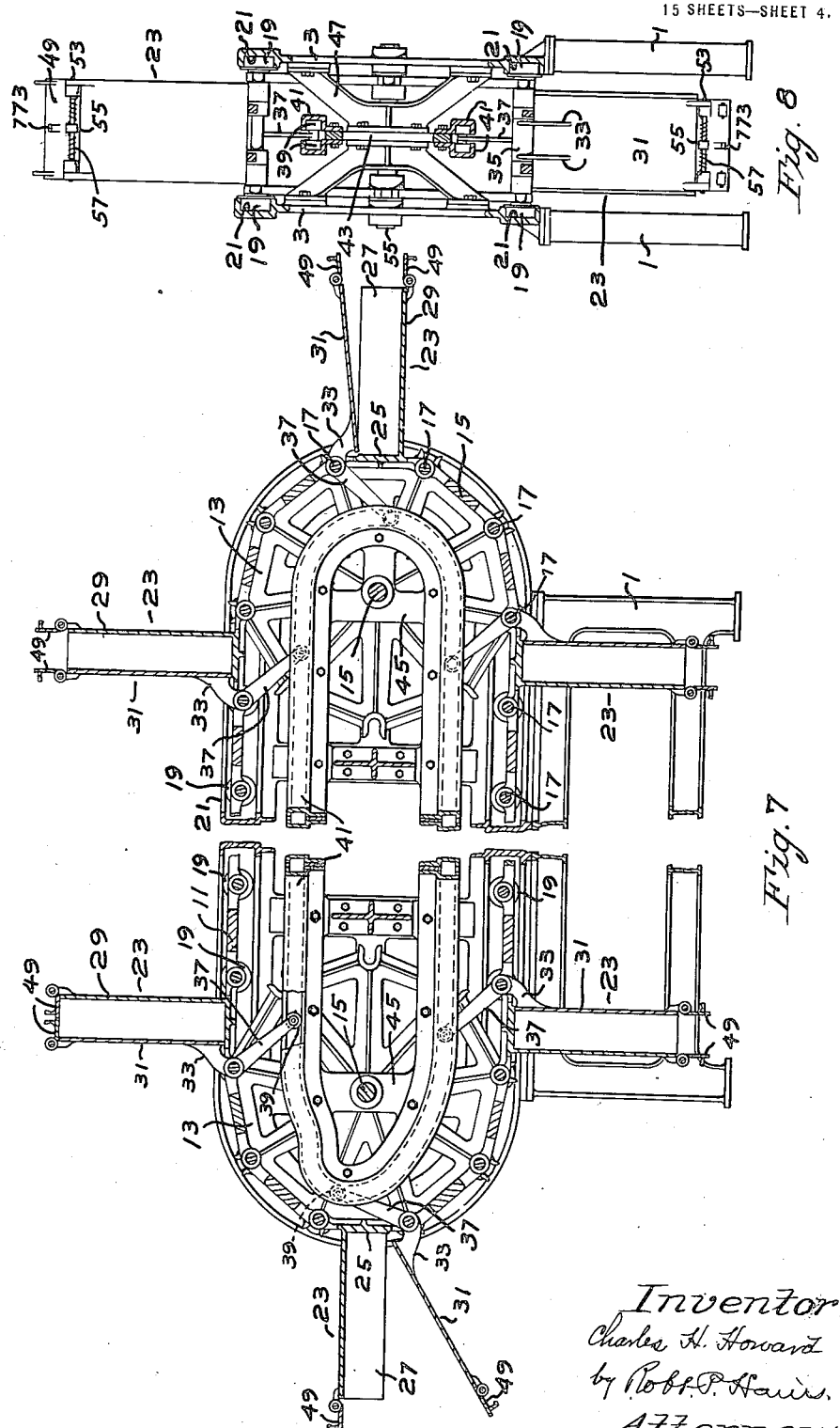

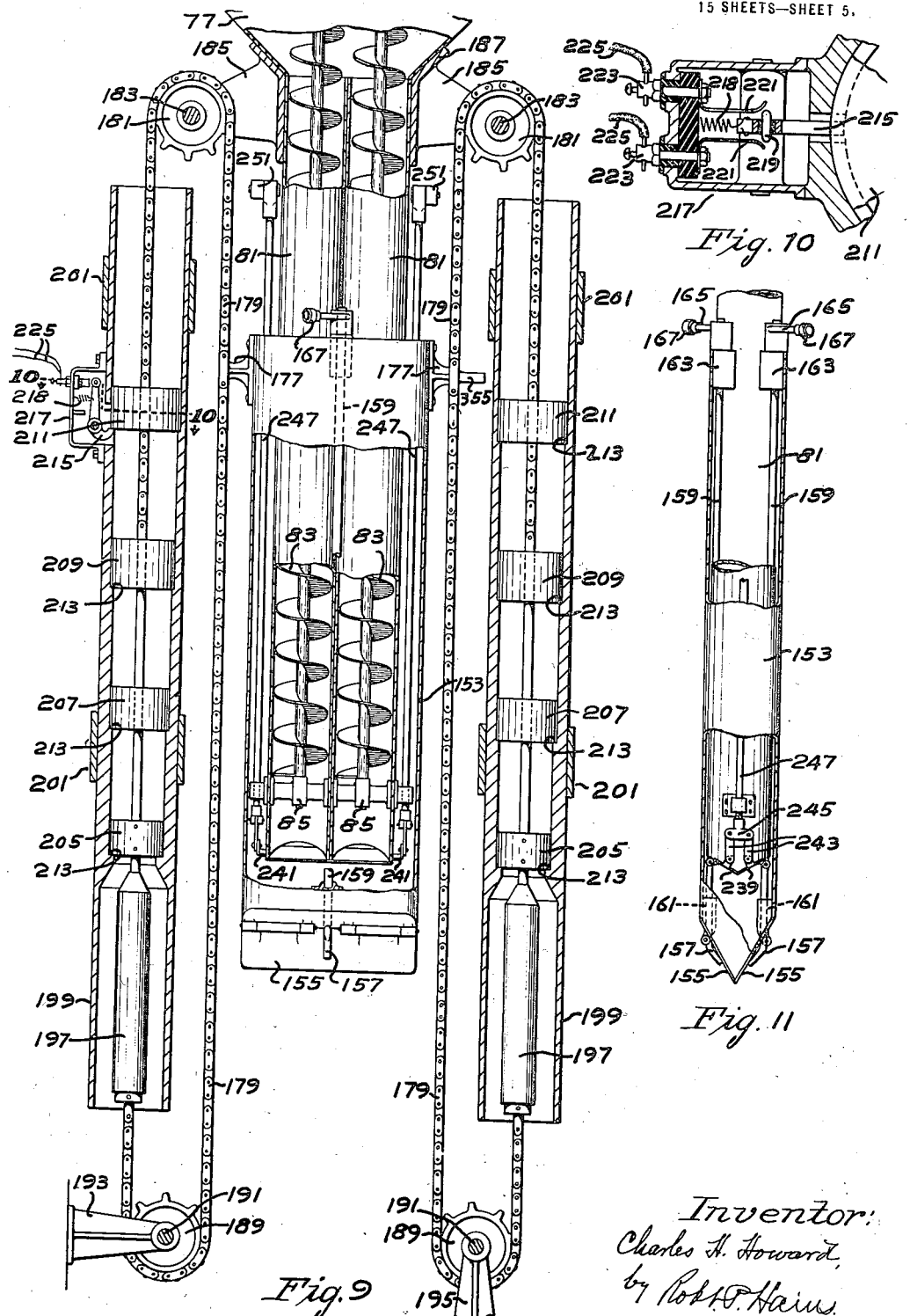

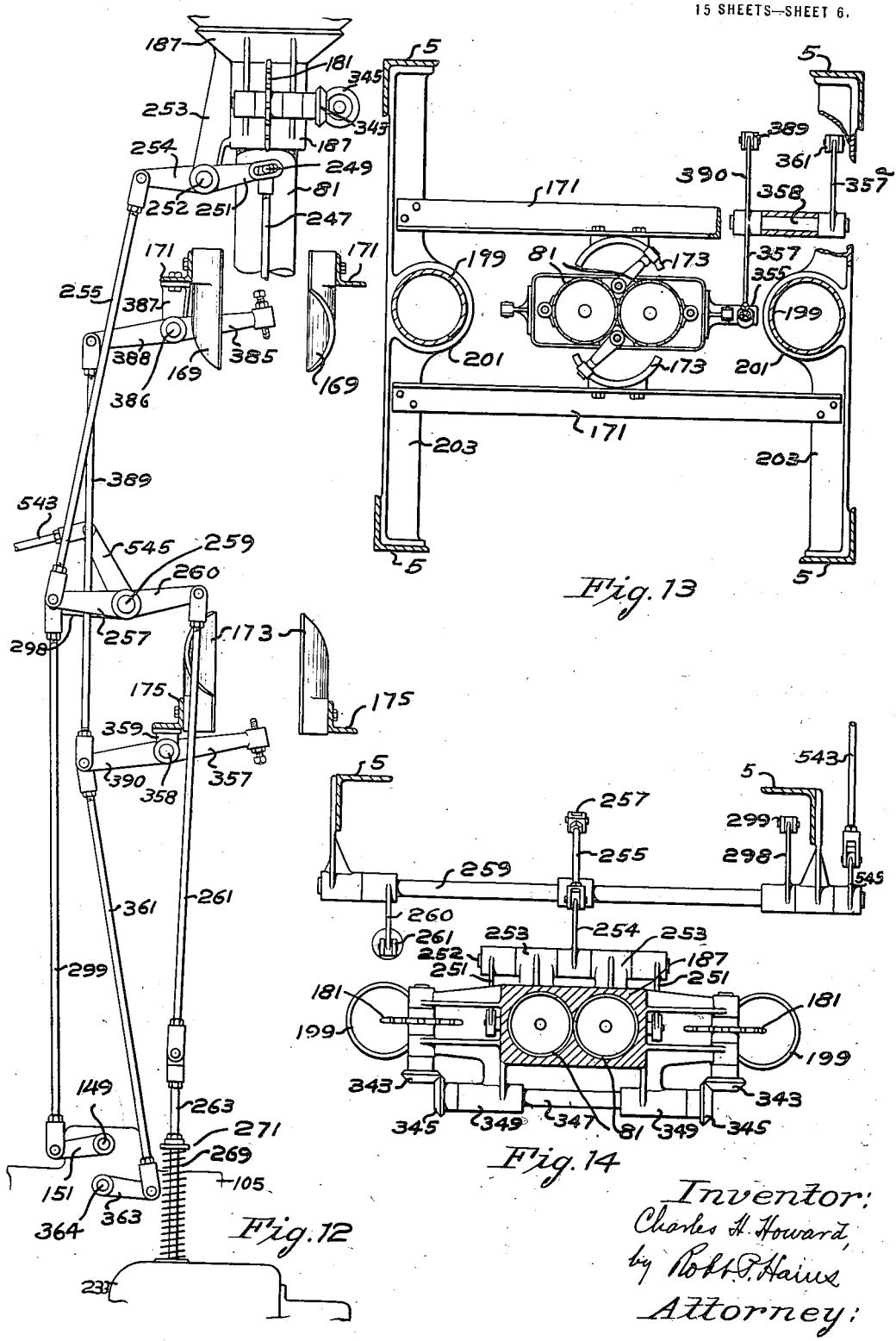

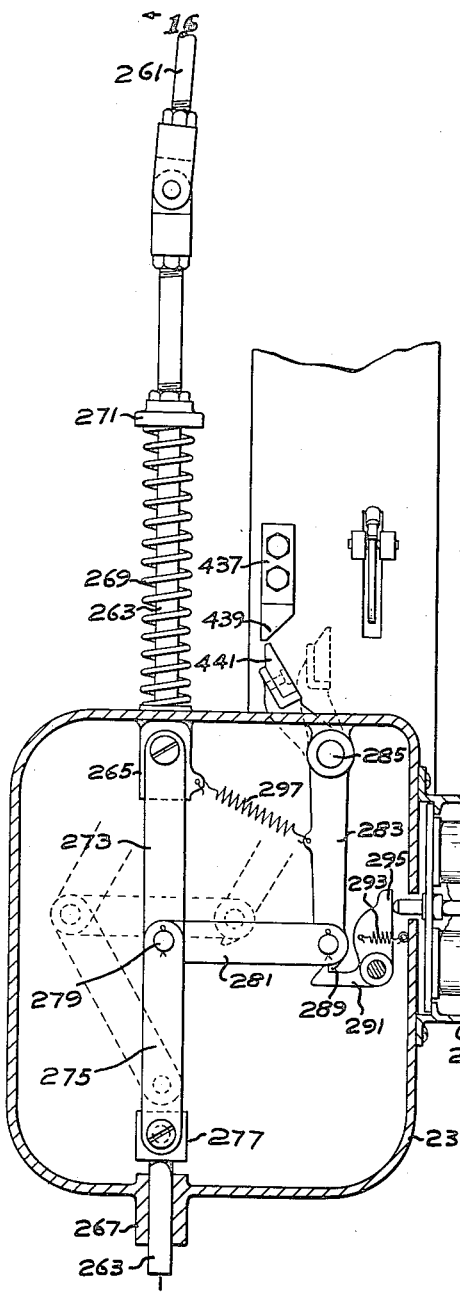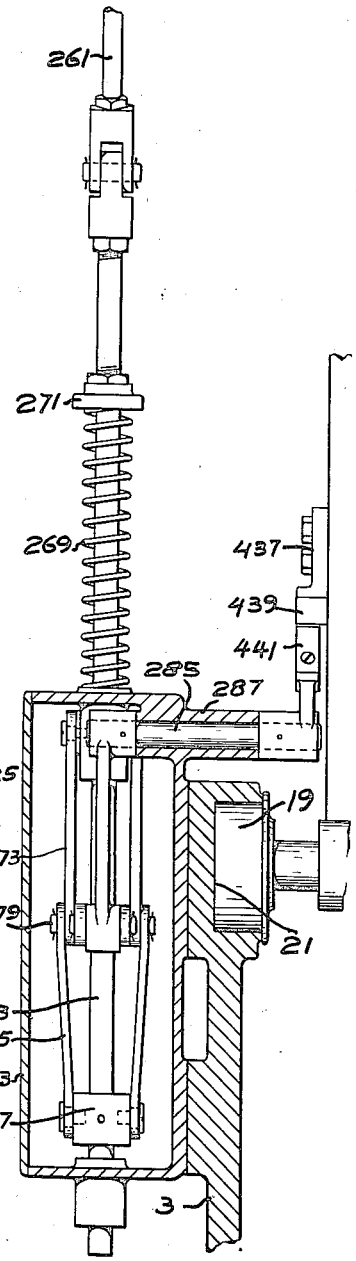

Inventor:
Charles H. Howard,
by Robt. P. Hains
Attorney

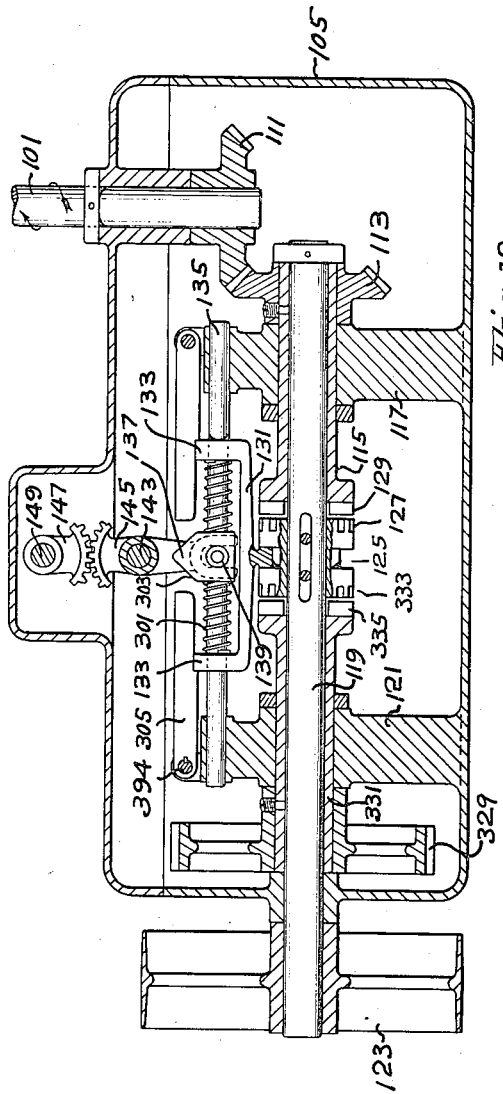

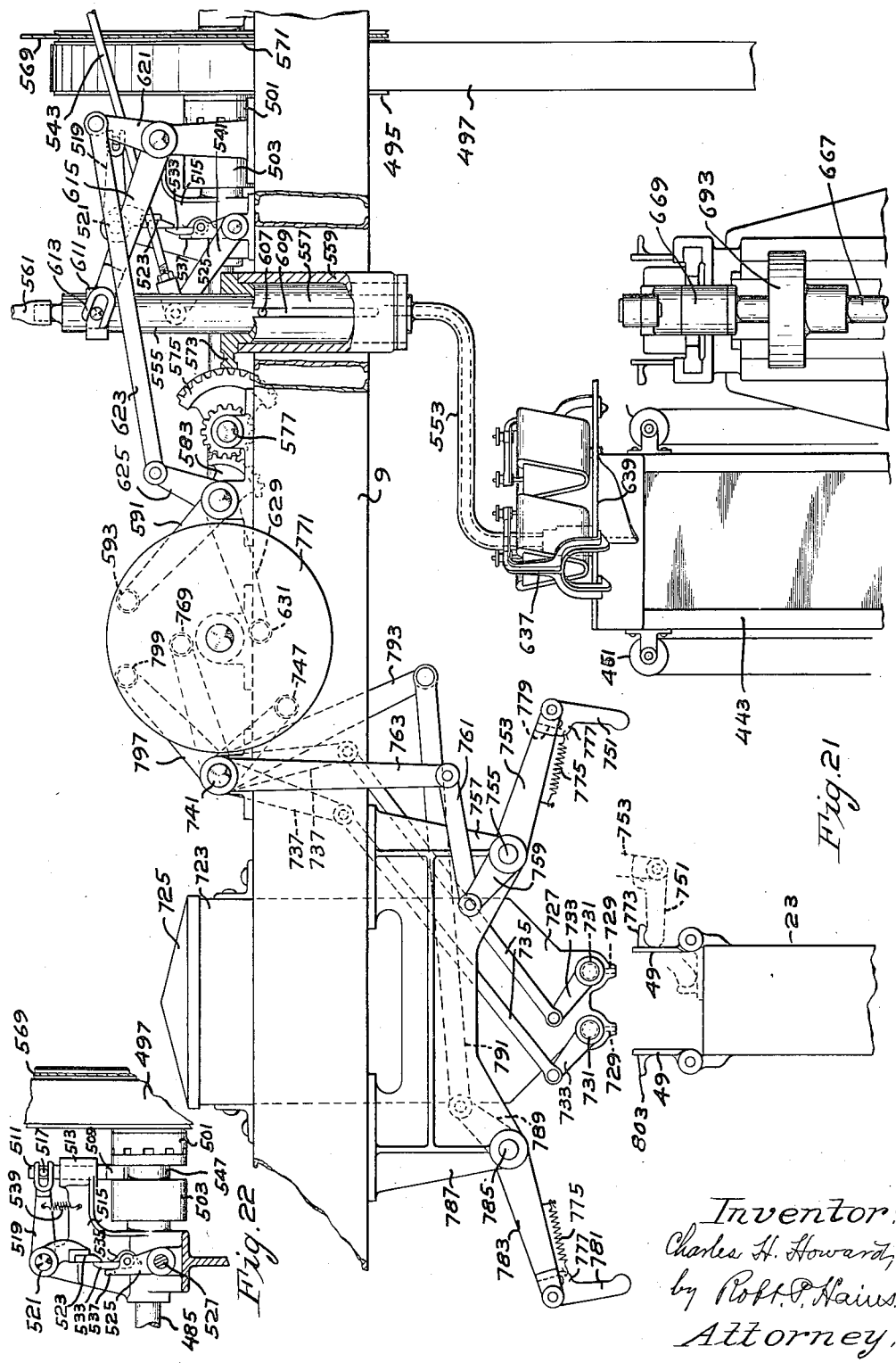

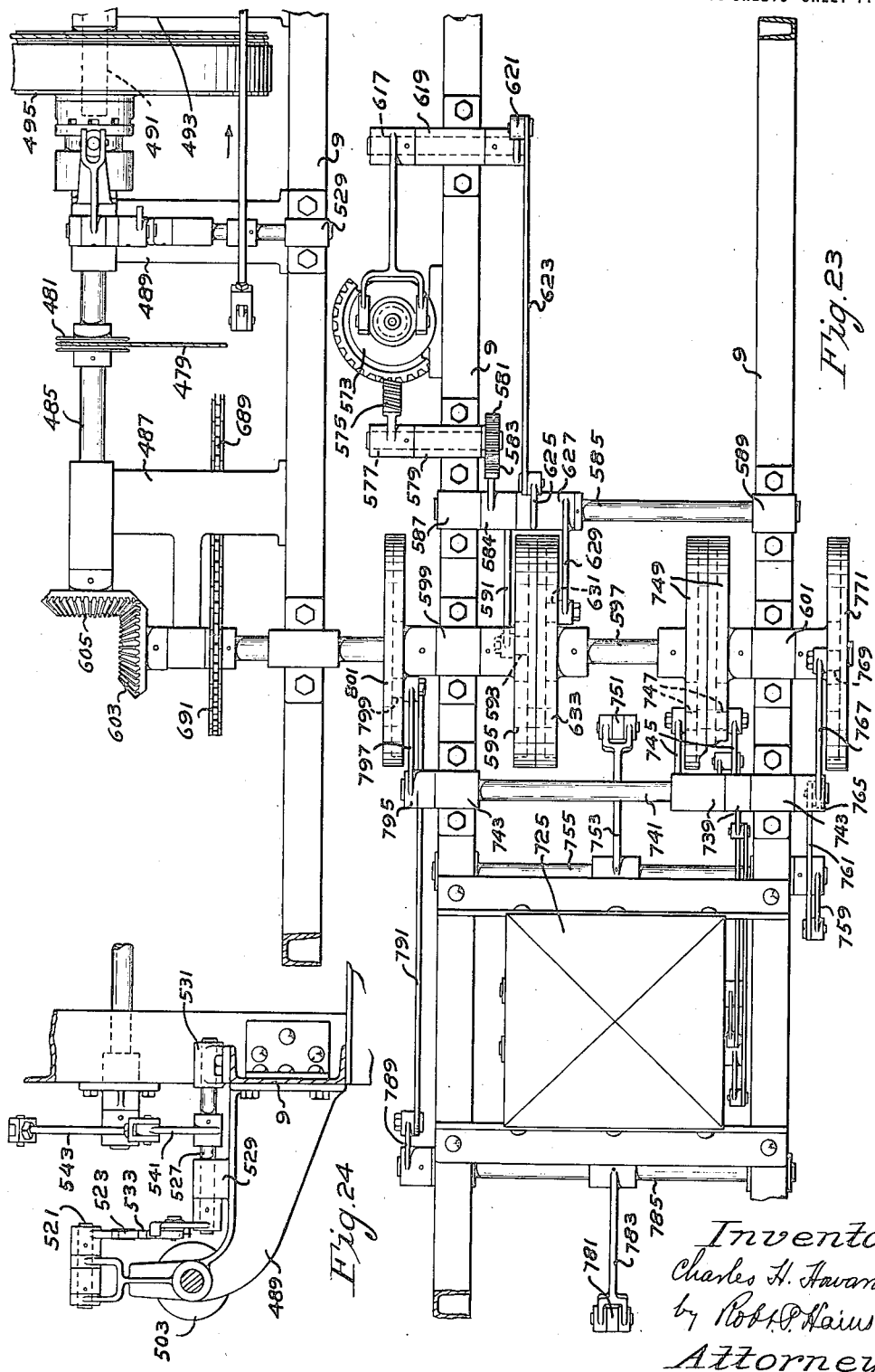

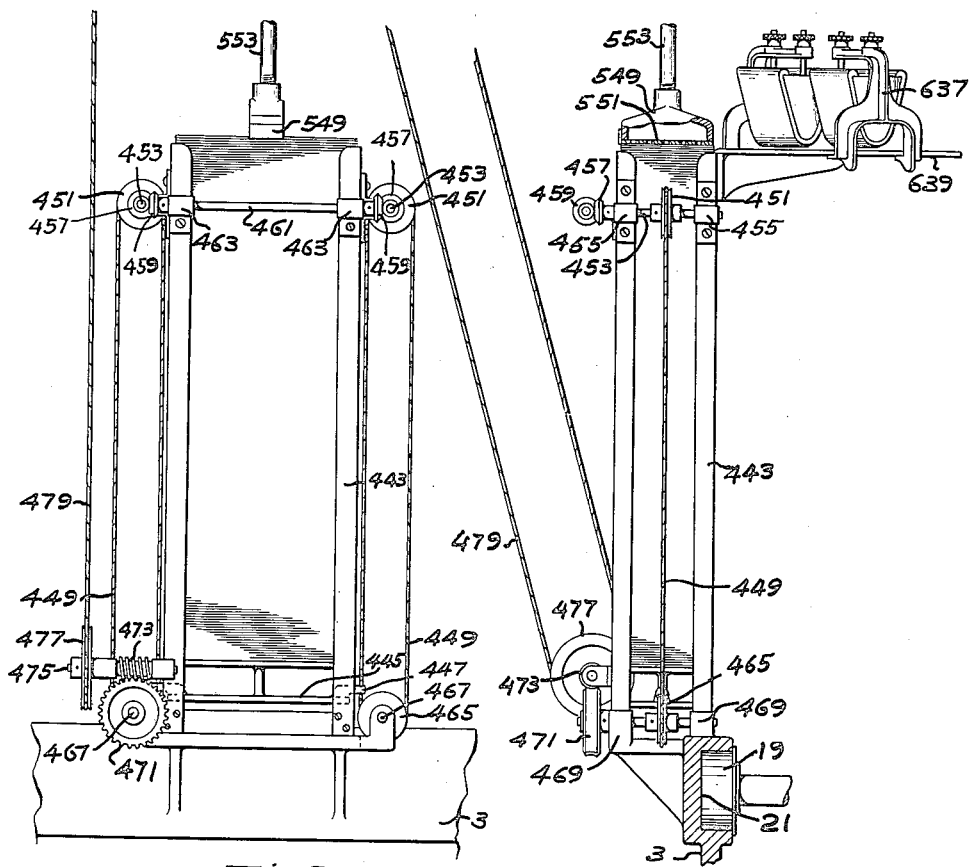
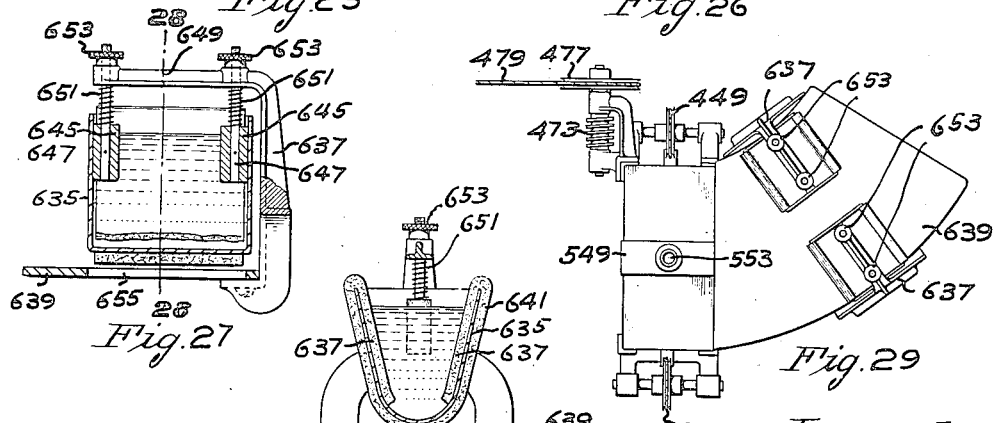

C. H. HOWARD.
BAG FILLING MACHINE.
APPLICATION FILED OCT. 26, 1918.

1,425,481.

Patented Aug. 8, 1922.
15 SHEETS—SHEET 13.

Inventor:
Charles H. Howard,
by Robt P. Hains.
Attorney.

C. H. HOWARD.
BAG FILLING MACHINE.
APPLICATION FILED OCT. 26, 1918.
1,425,481.
Patented Aug. 8, 1922.
15 SHEETS—SHEET 14.
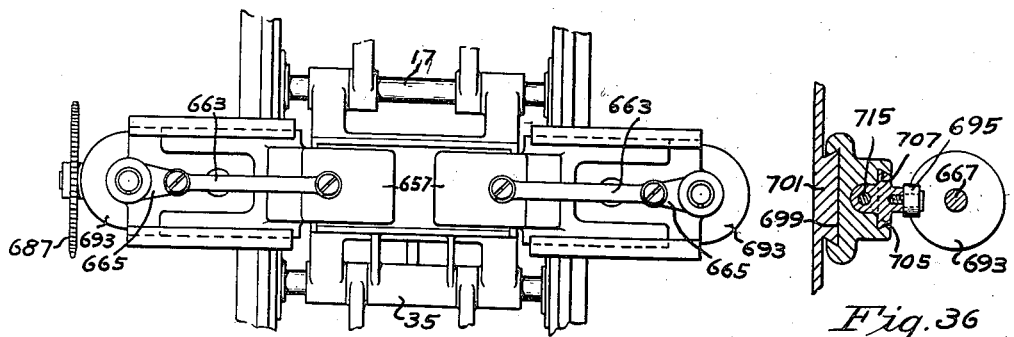
Fig. 34
Fig. 36
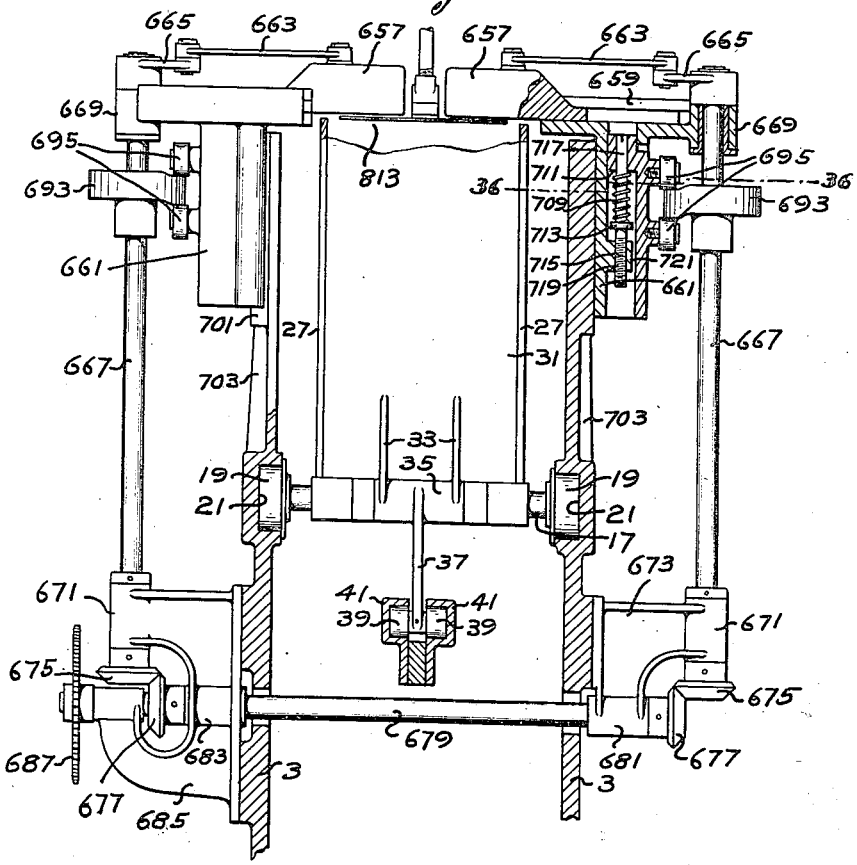
Fig. 35
Inventor:
Charles H. Howard,
by Robt. P. Haines
Attorney

UNITED STATES PATENT OFFICE.

CHARLES H. HOWARD, OF SAUGUS, MASSACHUSETTS, ASSIGNOR TO PAPER PRODUCTS MACHINE COMPANY, OF BOSTON, MASSACHUSETTS, A CORPORATION OF MASSACHUSETTS.

BAG-FILLING MACHINE.

1,425,481.  Specification of Letters Patent.  Patented Aug. 8, 1922.

Application filed October 26, 1918. Serial No. 259,882.

*To all whom it may concern:*

Be it known that I, CHARLES H. HOWARD, a citizen of the United States, residing at Saugus, in the county of Essex and State of Massachusetts, have invented an Improvement in Bag-Filling Machines, of which the following description, in connection with the accompanying drawings, is a specification, like characters on the drawings representing like parts.

The invention to be hereinafter described relates to machines for filling bags and other containers. One of the objects of the invention is to provide a machine which will automatically deliver a charge of predetermined weight to a paper bag, seal the bag after being filled, and then discharge the filled bag from the machine.

In carrying the invention into practical effect, in the present instance, the paper bags are conducted by a conveyor to a filling station where a charge of material, such, for example, as cement, is fed into a weighing receptacle, and after a predetermined weight has entered said receptacle, the supply of material is automatically cut off. In the course of the weighing of the material in the receptacle, the latter is automatically moved down into the bag or container toward the bottom thereof, and when nearly to the bottom, the lower end of the receptacle is opened to discharge the material into the bag. Then the weighing receptacle is elevated out of the bag, the construction and operation being such that the charge of material is introduced into the bag with a minimum amount of dust, thereby effecting an accurate delivery of the weighing charge with economy of material and with comfort to the operator of the machine.

After the bag has received the predetermined charge of material, it is conveyed by the bag carrier to a second station where a cap of paper or other suitable material may be transferred from a source of supply to the bag and superposed on the charge of material therein. The cap may have an adhesive coating on the upper surface thereof, and a suitable moistening device may be provided for automatically moistening this coating as the cap is transferred from the source of supply to the bag. Then a folding device comes into play and folds opposed sides of the upper portion of the bag over onto the moistened adhesive coating of the cap, and presses the folded over portions of the bag thereon so as to insure adhesive engagement therewith.

Then the bag is conveyed by the carrier to a third station where a waterproof adhesive, such, for example, as black asphaltum is applied to the upper portions of the bag which have been folded over as described at the previous station, and then a device comes into play for folding the other two opposed upper portions of the bag down onto the waterproof adhesive on the upper portions of the bag folded over at the previous station. Thus, the upper end of the bag is closed and effectively sealed with a waterproof adhesive which will prevent ingress of moisture into the package. This is an important consideration when the bags are filled with materials, such, for example, as cement, which has a highly absorbent character. Then the bags are conveyed by the carrier from the third station and discharged therefrom.

The weighing and filling, capping and folding operations may be simultaneously performed on three bags at the three different stations, and the operations at each station may be rapidly carried on. As a consequence, the bags may be rapidly filled, sealed and delivered from the machine.

The character of the invention will be best understood by the following description of one good form thereof shown in the accompanying drawings, wherein:—

Figure 1 is a front elevation of the machine shown herein as one embodiment of the invention;

Fig. 2 is a front elevation of the hopper for receiving the materials;

Fig. 3 is a rear elevation of the machine;

Fig. 4 is a rear elevation of the hopper;

Figure 6:
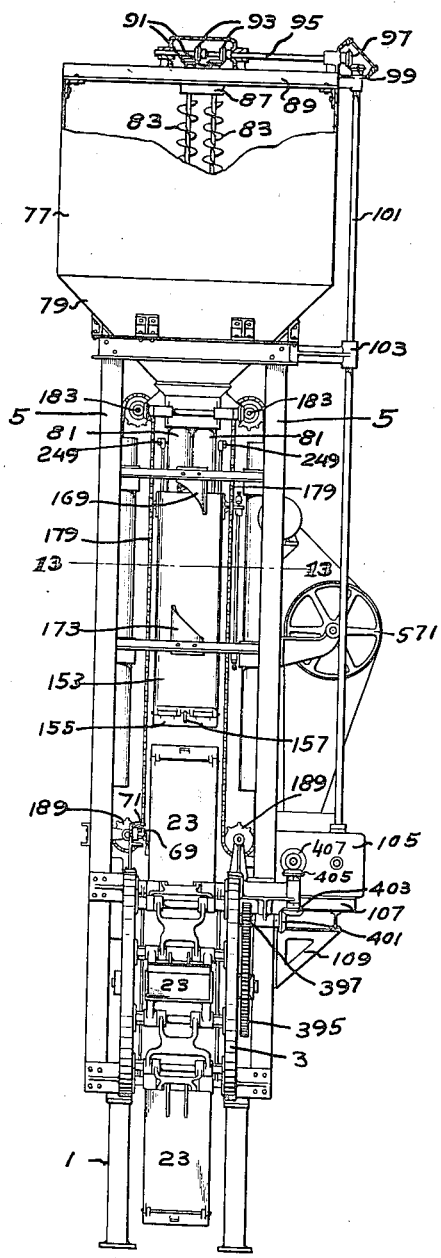
Fig. 6 is an end elevation looking toward the left of Fig. 1, a portion of the hopper being broken away to disclose feed screws therein.
Figure 17:
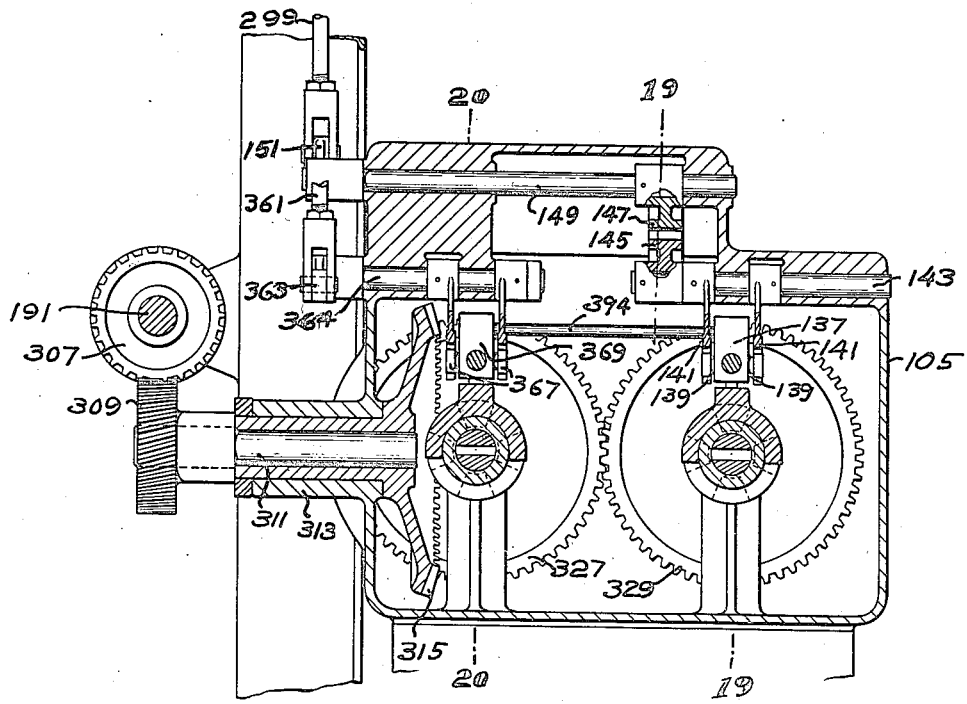
Figures 18, 18A, 18B, 18C:
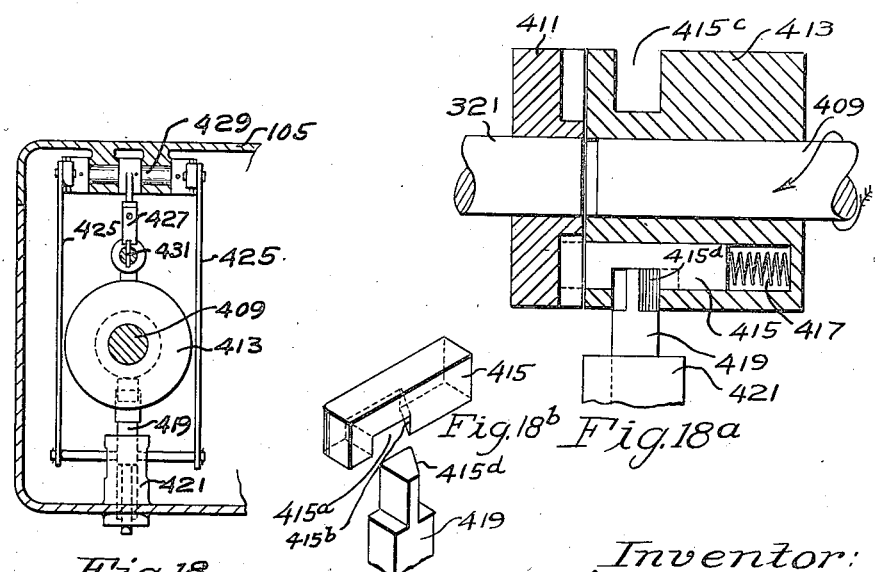
Figure 30:
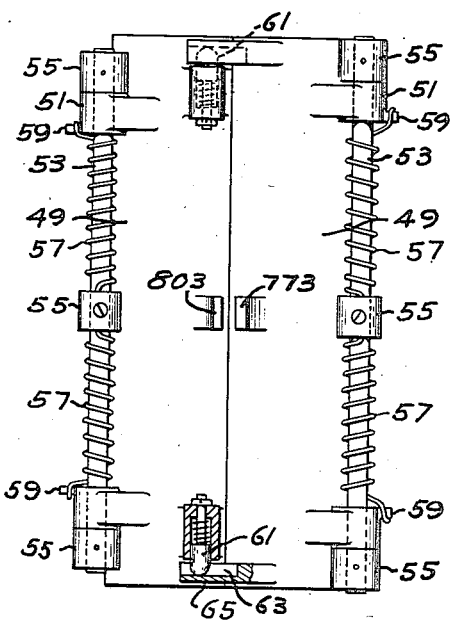
Figure 31:
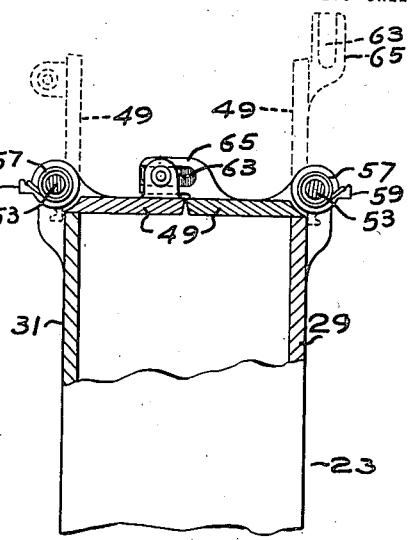
Figure 32:
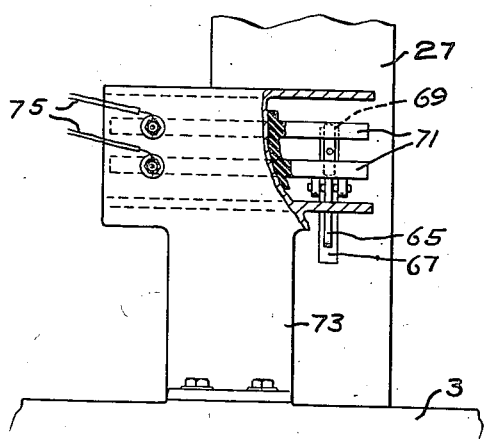
Figure 33:
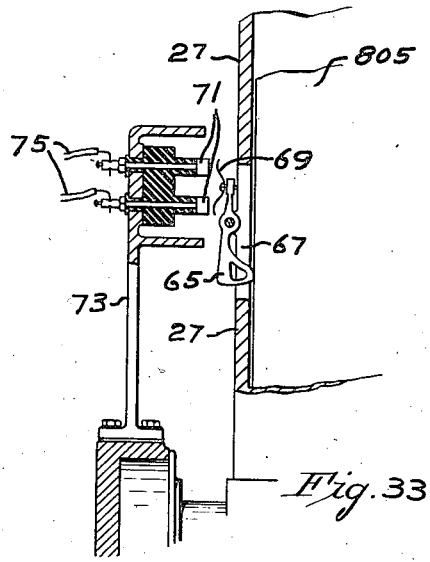

Fig. 7 on an enlarged scale is a vertical section through the bag conveyor;

Fig. 8 is an end elevation of the construction shown in Fig. 7; certain parts being shown in sections;

Fig. 9 on an enlarged scale is a view partly in elevation and partly in vertical section of the feeding tubes, the conveyors therein, the weighing receptacle, and the counterbalancing weights for the receptacle;

Fig. 10 on an enlarged scale is a horizontal section taken on line 10—10 of Fig. 9;

Fig. 11 is a view partly in elevation and partly in vertical section of the feeding tubes and weighing receptacle showing the valves or gates for controlling the discharge therefrom;

Fig. 12 on an enlarged scale is an elevation showing portions of the hopper, one of the feed tubes, the clutch and gear box, the electrically controlled toggle box, and a system of links and levers co-operating therewith for controlling various devices of the machine;

Fig. 13 on an enlarged scale is a horizontal section taken on line 13—13 of Fig. 6;

Fig. 14 on an enlarged scale is a horizontal section taken on line 14—14 of Fig. 1;

Fig. 15 on an enlarged scale is a vertical section taken through the toggle box;

Fig. 16 is a vertical section taken on line 16—16 of Fig. 15;

Fig. 17 is a vertical section taken on line 17—17 of Fig. 3 showing clutches and gears in the clutch and gear box;

Fig. 18 is a vertical section taken on line 18—18 of Fig. 20;

Fig. 18ª is a sectional detail of the single rotation clutch in the transmission for the bag carrier;

Figs. 18ᵇ and 18ᶜ are perspective details of the pin and latch of said clutch;

Fig. 19 is a vertical section taken on line 19—19 of Fig. 17;

Fig. 20 is a vertical section taken on line 20—20 of Fig. 17;

Fig. 21 on an enlarged scale is a view partly in elevation and partly in section showing the mechanism for applying the caps to the bags and folding over the upper end portions thereof;

Fig. 22 is a side elevation of a clutch mechanism for controlling the actuation of the parts shown in Fig. 21;

Fig. 23 is a plan of parts shown in Fig. 21;

Fig. 24 is a side elevation of mechanism co-operating with the clutch mechanism shown in Fig. 22;

Fig. 25 is a side elevation of the cap supply mechanism;

Fig. 26 is an end elevation of the cap supply mechanism and the moistening devices for the caps;

Fig. 27 is a sectional detail showing the construction of one of the moistening devices;

Fig. 28 is a vertical section taken on line 28—28 of Fig. 27;

Fig. 29 is a plan of the mechanism shown in Fig. 26;

Fig. 30 is a plan of the bag holder showing its cover closed;

Fig. 31 is a view partly in section and partly in elevation of the bag holder showing the cover open;

Fig. 32 is a view partly in section and partly in elevation of a stop device for the bag carrier;

Fig. 33 is a sectional detail of the stop device shown in Fig. 32;

Fig. 34 is a plan of means for folding over upper end portions of the bag onto the cap;

Fig. 35 is a view partly in side elevation and partly in vertical section of the means shown in Fig. 34;

Fig. 36 is a sectional detail taken on line 36—36 of Fig. 35; and

Figs. 37 to 42 are views of one form of bag which may be used in the machine, and illustrating the successive appearances of the bag in the course of the filling, capping, closing and sealing operations.

Referring to the drawings, the machine shown therein as one good form of the invention may be provided with any suitable frame for supporting the various instrumentalities of the machine. In the present instance of the invention, this frame comprises bases 1 (Figs. 1 and 3) supporting elongated front and rear frames 3 for supporting the bag carrier. Rising from said side frames is a tower 5 for supporting the mechanism at the bag filling station, and also rising from said side frames are posts 7 supporting an upper horizontal frame 9 carrying parts of the mechanism at the station for applying the caps to the bags and at the station for folding over and sealing the upper portions of the bag.

Any suitable mechanism may be provided for receiving the bags and conveying the same to the successive stations. For this purpose, in the present instance of the invention, a carrier is provided comprising sprocket chains 11 (Figs. 7 and 8) on sprocket wheels 13 mounted on shafts 15 journalled in bearings in the front and rear frames 3, referred to. These sprocket chains comprise links 15 connected by shafts 17 provided with flanged rollers 19 guided by tracks 21 carried by the front and rear frames 3, and serving effectively to guide the sprocket chains in an elliptic-like orbit.

The sprocket chains may be equipped with suitable means for properly receiving, holding and discharging the bags. This means, in the present instance, comprises a series of holders 23 (Figs. 7 and 8) mounted on and secured to certain links of the sprocket chains at suitable intervals. Each of these holders may have a bottom 25 which may conveniently be the link carrying the holder, and end walls 27 connected by a side wall 29. To facilitate reception and discharge of the bag, the opposite side wall 31 may be movably mounted with respect to the holder. In the present form of the invention, this movable side is provided with arms 33 connected to a boss 35 adapted to rock on one of the shafts 17 connecting the links of the sprocket chains. To automatically open and close the side 31 at the times required, the boss 35 may have an arm 37 fast thereon projecting inward from the sprocket chain, and provided with rollers 39 adapted to travel in opposed cam guides 41 carried by a web 43 secured to members 45 receiving the sprocket wheel shafts 15, referred to, and secured to X-shaped frames 47 (Fig. 8) secured to and serving to brace the front and rear frames 3 of the machine.

The shape of the cam guides 41 is such that the sides 31 of the bag holders will be open when at the receiving end of the machine, as shown at the right of Fig. 1, will be closed in traversing the upper horizontal run of the sprocket chains, will be automatically opened when at the delivery end of the machine, as shown at the left of Fig. 1, and will be closed when traversing the lower horizontal run of the sprocket chains.

To assist in folding the upper end portion of the bag and to maintain said portions in their folded relation while the bag is conveyed from the folding station to the discharge end of the machine, each holder may be provided with a cover comprising sections 49 (Figs. 30 and 31) having their outer edges provided with bosses 51 fulcrumed on shafts 53 secured to boss brackets 55 at the upper ends of the sides 29 and 31 of the holder. To normally hold the cover sections in open positions, as shown in dotted lines in Fig. 31, coil springs 57 may be provided encircling the shafts 53, and having ends secured to spurs 59 on the bosses 51, and portions intermediate said ends secured to certain of the bosses 55. The construction is such that the springs will tend to open the cover sections, but will allow closing thereof at the times required.

To secure the cover sections in closed position during their transit from the folding station to the discharge end of the machine, they may be provided with suitable locking means, in the present instance, consisting of spring-pressed latches 61 on one of the sections adapted to enter slots 63 in ears 64 on the other section. The construction is such that when the bag holder reaches the discharge end of the machine, the hinged side 31 thereof will swing outwardly and withdraw the latches from the slots and allow the springs to open the cover sections.

The bags may be introduced in the bag holders of the bag carrier manually or automatically as desired, so that as each holder passes from the receiving end of the machine, it will convey a bag to the filling station. Suitable detector means may be provided to automatically arrest the machine, in case for any reason a bag should fail to be introduced into one of the bag holders. This detector means, in the present instance of the invention, comprises a detector finger 65 (Figs. 32 and 33) pivotally mounted on the wall 27 of each bag holder, and adapted to project through a slot 67 into the holder. This finger carries a bridge contact 69 at one end thereof adapted to engage a pair of fixed contacts 71 carried by a bracket 73 (Fig. 1) mounted on one of the frames 3 adjacent the receiving end of the machine. These contacts may be connected by wires 75 with an electrical cut out in the driving mechanism for the machine, but since this electrical cut out is of usual construction, it is deemed unnecessary to show the same herein. The construction is such that when a bag is in the holder, the bridge contact 69 is retracted so that it will not engage the fixed contacts 71 as the bag holder passes the bracket 73. If, however, there is not a bag in the holder, the detector finger 65 will gravitate to a position such that the bridge contact 69 will engage the fixed contacts 71 and complete the circuit to the electrical cut out, thereby opening the same and arresting the machine.

Having described the bag holders and the carrier therefor, next will be described the means for filling the bags. This means, in the present instance, comprises a hopper 77 (Figs. 1–4) mounted on the top of the tower 5, referred to, and provided with a tapered bottom 79. Suitable means may be provided for feeding the material from the hopper. To accomplish this, in the present instance, a pair of tubes 81 (Figs. 9 and 11) are provided depending from and communicating with the hopper and in closely assembled relation. It is desirable that the materials shall be positively fed from the hopper downward through these tubes. For this purpose, the tubes are provided with a pair of feed screws 83 on shafts having lower ends journalled in bearings 85 suitably supported adjacent the lower ends of said tubes, and journalled in bearings in a member 87 (Fig. 6) carried by a horizontal support 89 at the top of the hopper.

To rotate said feed screws, their upper ends may have beveled gears 91 fast thereon meshing with beveled gears 93 on a horizontal shaft 95 journalled in bearings at the top of said hopper. One end of said horizontal shaft has a bevel gear 97 fast thereon meshing with a bevel gear 99 fast on the upper end of a vertical shaft 101 projecting downward along the hopper through a bearing 103 in a bracket secured to the tower 5, and thence along the tower into the clutch and gear box 105 carried by a frame 107 on brackets 109 (Figs. 3 and 6) secured to one of the frames 3, referred to. On the lower end of the vertical shaft 101 in the clutch and gear box is a bevel gear 111 (Fig. 19) meshing with a bevel gear 113 fast on a sleeve shaft 115 journalled in a bearing 117 in said box. The main driving shaft 119 of the machine projects through the sleeve shaft 115 and through a bearing 121 outward beyond said box, where it receives a pulley 123 adapted to be driven by a belt from an electric motor or other suitable source of power.

To drive the feed screws at the times required, a clutch member 125 (Fig. 19) is mounted on the main driving shaft 119 and is adapted to rotate therewith, but slide longitudinally thereof. The clutch member has teeth 127 for engagement with opposed teeth 129 on one end of the sleeve shaft 115. To shift the clutch, a yoke 131 is connected to the clutch member 125, and has arms 133 adapted to receive a rod 135 slidably mounted in upper extensions of the bearings 117 and 121. A block 137 (Fig. 17) fast on the rod 135, has studs 139 projecting therefrom received by forks 141 fast on a rock shaft 143 mounted in a bearing at the top of the box 105. A toothed sector 145 fast on the shaft 143 meshes with a toothed sector 147 fast on a shaft 149 mounted in bearings at the top of the box 105. One end of the shaft 149 projects beyond said box and receives a crank 151 (Figs. 12 and 17) adapted to be operated, as more fully hereinafter described.

Suitable means may be provided to receive the material fed positively by the feed screws from the tubes 81, and to deliver a predetermined charge from the feed tube into the bag to be filled at the station beneath the feed tubes. This means, in the present instance of the invention, comprises a weighing receptacle 153 (Figs. 9 and 11) conveniently of general elliptic form sufficiently large to receive the feed tubes with a substantial space between said receptacle and tubes. The lower end of the weighing receptacle may be provided with valve means for controlling the discharge of the material from the receptacle into the bag. This valve means, in the present form of the invention, comprises a pair of gates 155 hinged to the lower end of the receptacle, and preferably converging downward and having their lower edges meeting when closed, as shown in Fig. 11. Suitable means may be provided for opening and closing these gates at the times required. This means, in the present instance, comprises fingers 157 at the lower ends of rods 159 projecting upward through spaces between the feed tubes and the receptacle, and adapted to rock in bearings 161 secured to the lower end of the receptacle and in bearings 163 secured to the upper end of the receptacle. These rods may be rocked to turn the fingers inward to close the gates 155, and may be rocked outward to allow the gates to swing open from the weight of the material thereon. It is desirable that the gates should be closed when the receptacle approaches its upward limit of movement, and should be opened as the receptacle approaches the bottom of the bag. To accomplish this, in the present form of the invention, the rods 159 are provided at their upper ends with arms 165 carrying rollers 167 adapted to engage upper cams 169 mounted on cross bars 171 (Fig. 1) carried by the tower, and adapted to engage lower cams 173 (Figs. 1, 12 and 13) mounted on cross bars 175 carried by the tower. The construction is such that as the receptacle approaches its upper limit of movement, the arm rollers 167 will wipe along the cams 169 and close the gates 155, and when the receptacle approaches its lower limit of movement, the arm rollers will wipe along the cam 173 and allow opening of said gates.

Suitable means may be provided to counterbalance the weight of the receptacle. To accomplish this, in the present instance, the receptacle is provided with lugs 177 (Fig. 9) adjacent the upper end thereof, and connected to links of sprocket chains 179 on upper sprocket wheels 181 on shafts 183 mounted in brackets 185 projecting laterally from a neck 187 adjacent the juncture of the hopper with the feed tubes. The sprocket chains also pass around lower sprocket wheels 189 on shafts 191 mounted in brackets 193 and 195 respectively carried by the frame of the machine.

Secured to the sprocket chains are tare weights 197 in tubes 199 carried by sleeves 201 on cross bars 203 (Fig. 13) on the tower. These tare weights will serve to counterbalance the weighing receptacle when empty. As the material is fed into the receptacle, the latter will lower and cause the tare weights to move upward in their tubes.

Suitable means may be provided for accurately weighing the charge fed into the receptacle and insuring the delivery from the receptacle into the bags of charges of equal predetermined weights. This means, in the present instance of the invention, comprises series of weights 205, 207, 209 and 211 which may be progressively brought into play to gradually check the lowering movement of the weighing receptacle until the final weights 211 come into play. Then the feed of material to the receptacle is automatically shut off by means to be described, and the charge in the receptacle is delivered into the bag. In the present form of the invention, the series of weights are mounted in the tubes 199 and are supported on steps 213 formed in said tubes at intervals. The construction is such that as the receptacle moves downward and the tare weights move upward, the latter will move to and lift the lowest weights 205 from their seats and then as the tare weights continue to move upward, the weights 205 will lift the weights 207 from their seats, and the weights 207 will lift the weights 209 from their seats, and finally the weights 209 will lift the weights 211 from their seats. On the occurrence of this event, further feed of material into the weighing receptacle is arrested.

Next will be described the means for automatically cutting off the feed of material from the feed tubes to the weighing receptacle when the upper weights 211 are lifted from their seats. This means, in the present instance, comprises a dog 215 (Figs. 1, 9 and 10) pivotally mounted in a box 217 secured to one of the weight supporting and guiding tubes 199. This dog is adapted to project through an opening in said tube and engage the bottom of one of the upper weights 211 when the latter is resting on its seat, said dog being held against said weight by a coil spring 218 having one end attached to the dog and the other end attached to the box 217. The upper end of this dog carries a bridge contact 219 adapted to connect a pair of fixed spring contacts 221 secured to posts 223 attached to the outer wall of the box. These posts are connected by conductors 225 with the coils of a magnet 227 (Fig. 15), a battery 229 or other suitable source of electricity being connected into one of said conductors. The magnet 227 may be mounted in a box 231 secured to the toggle box 233 (Figs. 1 and 15) mounted on one of the frames 3, referred to. Co-operating with the magnet 227 is an armature 235 connected to a pin 237 projecting into the toggle box 233.

The feed tubes may be provided with suitable valve means which may be automatically closed by an instrumentality to be described which is set in operation on energization of the magnet and thrusting of the armature pin 237 into the toggle box. This valve means, in the present instance, comprises a pair of gates 239 (Figs. 9 and 11) common to the two feed tubes 81 and hinged thereto at the lower ends thereof. These gates are adapted to converge downward and have their free edges meet when in closed position, and are swung outward to permit feed of material from the feed tubes to the weighing receptacle. To operate these gates, they may have arms 241 at opposed ends thereof connected by links 243 with heads 245 on the lower ends of rods 247 projecting vertically upward in spaces between the feed tubes and weighing receptacle, as will be noted in Fig. 9. The upper ends of said rod carry rollers 249 entered into elongated openings in rock levers 251 (Figs. 1, 3 and 12) fast on a shaft 252 on brackets 253 secured to and depending from the neck 187, referred to. An arm 254 fast on shaft 252 is connected by a rod 255 with one end of a rock lever 257 fast on a rock shaft 259 journalled in bearings mounted on the tower, an arm 260 fast on the rock shaft 259 is connected by a rod 261 with the upper end of a plunger 263 which projects through boss bearings 265 and 267 on the toggle box 233. The plunger is normally urged upward by a coil spring 269 confined between the upper end of the boss bearing 265 and a collar 271 secured to the plunger.

Suitable means may be provided for energizing said spring-pressed plunger and releasing the same. To accomplish this, in the present instance, a toggle may be provided comprising pairs of links 273 and 275, the former having their outer ends pivotally connected to the boss bearing 265, and the latter having their outer ends pivotally connected to a block 277 fast on the plunger. The inner ends of the toggle links 273 and 275 may be connected by a pin 279. When this toggle is straightened, it will draw the plunger down and compress the spring 269, and when buckled, it will allow the spring to shift the plunger upward. To lock the toggle in its straightened position, a link 281 may have one end connected thereto and its opposite end connected to an arm 283 secured to a shaft 285 mounted in a boss bearing 287 at the top of the toggle box. The arm 283 has a toe 289 at the lower end thereof adapted to be engaged by a bell-crank latch 291 pivotally mounted in the toggle box and normally held against said toe by a coil spring 293. Said latch has an arm 295 which projects upward in the path of the armature pin 237, referred to. The coil spring 297 having one end connected to the arm 283 and its opposite end connected to the boss bearing 265, tends to rock the arm 283 to the left of Fig. 15 and buckle the toggle links from their position shown in full lines to their position shown in dotted lines in Fig. 15.

The construction described is such that when the weighing receptacle moves downward sufficiently far to lift the upper weights 211 from their seats, the spring 218 will rock the dog 215 to the left (Figs. 9 and 10) and cause the bridge contact 219 to engage the spring contacts 221. This will complete the circuit to the electric magnet 227, and the latter will attract the armature 235, push the pin 237 to the left of Fig. 15, and release the latch 291 from the toe 289 of the arm 283. This will allow the spring 297 to rock the arm 283 and link 281 to the left of Fig. 15, and buckle the toggle. This will release the spring 269 which will shift the plunger 263 upward and through the rod 261, rock levers 260 and 257, rod 255, rock levers 251, 254 and rods 247, will close the feed tube gates 239, thereby interrupting the feed of material from said tubes to the weighing receptacle.

The shifting of the spring-pressed plunger as described may also be utilized to shift the clutch member 125, referred to, for interrupting the rotation of the feed screws in the feed tubes simultaneously with the closing of the gates for the latter. To accomplish this, the rock shaft 259, referred to, may have an arm 298 fast thereon connected by a rod 299 with the crank 151 on the shaft 149 in the clutch and gear box 105. The upward movement of the spring-pressed plunger 263 will operate through the rod 261, rock lever 298, rod 299, crank 151, shaft 149, toothed sectors 147 and 145 and arms 141 to shift the block 137 to the left of Fig. 19. This will energize a coil spring 301 confined between said block and one of the arms 133 of the yoke 131, referred to, until a cam incline 303 of said block engages and trips a trigger 305 having a shoulder engaging the arm 133. This will allow the coil spring 301 to shift the yoke sharply to the left of Fig. 19 and disconnect the teeth 127 of the clutch member from the teeth 129 of the sleeve shaft 115 in the transmission to the feed screws, thereby automatically arresting the latter.

Having described the means for automatically closing the feed tube gates and arresting the feed screws after a charge of predetermined weight has entered the weighing receptacle, next will be described suitable means co-operating with the roller arms 165 and rods 159, referred to, for rocking the same to allow opening of the gates 155 of the weighing receptacle from the weight of the material thereon. When the weighing receptacle has come to rest after a predetermined charge has entered therein, it is in a position such that the roller arms 165 are somewhat above the lower fixed cams 173, referred to.

Next will be described means for automatically moving the weighing receptacle downward so that the rollers of the arms 165 may wipe along the lower fixed cams 173 and rock the rods 159 and arms 157 to effect the opening of the weighing receptacle gates 155. To this end one of the shafts 191 for one of the lower sprocket wheels 189 may have a spiral gear 307 (Fig. 17) fast thereon meshing with a spiral gear 309 fast on a shaft 311 journalled in a bearing in a boss 313 on the clutch and gear box 105. A bevel gear 315 fast on the shaft 311 meshes with a bevel pinion 317 and a bevel pinion 319 (Fig. 20) loose on a shaft 321 parallel to the shaft 119, referred to, and journalled in bearings 323 and 325 in the clutch and gear box.

To drive the shaft 321, a gear 327 is mounted fast thereon and meshes with a gear 329, as will be noted in Fig. 17, fast on a sleeve shaft 331 journalled in the bearing 121 referred to, and receiving the main driving shaft 119.

To connect the sleeve 331 with the main driving shaft 119 at the times required, the clutch member 125, referred to, may have teeth 333 thereon adapted to engage teeth 335 on one end of said sleeve shaft. The construction is such that when the clutch member 125 is given its shifting movement to interrupt the rotation of the feed screws, it causes the teeth 333 to engage the teeth 335, and thus the gears 329 and 327 and the shaft 321 is rotated, but since the pinions 317 and 319 are loose on the shaft 321, neither of them will be rotated until connected therewith. To accomplish this, the clutch member 337 (Fig. 20) may be provided on the shaft 321 and rotate therewith, but be susceptible of a slight sliding movement longitudinally thereof. This clutch member has teeth 339 adapted to engage teeth 341 on the bevel pinion 317.

The clutch member 337 is shifted to connect the bevel pinion 317 with the shaft 321 at the time the clutch member 125 is shifted to connect the main driving shaft with the sleeve shaft 331. As a consequence, on such shifting of the clutch member 125, the bevel pinion 317 will be rotated, and the latter will rotate the bevel gear 315, the shaft 311, the spiral gears 307 and 309, and thus impart rotation to one of the lower sprocket wheels, 189, thereby causing one of the sprocket chains 179 to travel and move the weighing receptacle downward. To insure equal movements of both of the sprocket chains 179, the shafts 183 for the upper sprocket wheels 189 may be connected by suitable transmission means, in the present instance, comprising bevel gears 343 (Figs. 1 and 14) fast on the shafts 183 meshing with bevel gears 345 fast on the cross shaft 347 journalled in bearings 349 carried by the neck 187 at the juncture of the hopper with the feed tubes.

The downward movement thus imparted to the weighing receptacle will cause the rollers 167 on the arms 165 to rock the rods 159 and arms 157 and allow opening of the gates 155, thereby allowing the charge of material in the weighing receptacle to pass into the bag. When the weighing receptacle is in its lowest position, the gates 155 are closely adjacent to the bottom of the bag. After the gates have been opened as described, it is desirable to elevate the weighing receptacle to withdraw the walls thereof upward between the charge of material and the walls of the bag, thereby to transfer the charge to the bag without dust and loss of material.

Therefore, next will be described suitable means for elevating the weighing receptacle. This means, in the present instance, comprises clutch teeth 351 (Fig. 20) on the clutch member 337, referred to, adapted to engage clutch teeth 353 on the bevel pinion 319. When the clutch member is shifted to the right of Fig. 20, it will disconnect the bevel pinion 317 from the shaft 321 and connect the bevel pinion 319 with said shaft, and thereby cause the bevel gear 315, shaft 311 and spiral gears 307 and 309 to rotate in a direction to elevate the weighing receptacle.

Suitable means may be provided for automatically shifting the clutch member 337 to elevate said receptacle. To accomplish this, in the present instance, the weighing receptacle is provided with a tappet 355 (Fig. 9) adjacent the upper end thereof and conveniently forming a continuation of one of the lugs 177. This tappet when travelling downward is adapted to engage a rock lever 357 (Figs. 1, 3 and 12) fast on a shaft 358 carried by a bracket 359 secured to one of the cross bars 175, referred to, on the tower. A rock lever 357$^a$ fast on the shaft 358 is connected by a rod 361 with a crank 363 on an end of the shaft 364, projecting outward from the clutch and gear box 105. The shaft 364 has a pair of arms 365 (Figs. 17 and 20) thereon having forked ends receiving rollers 367 on pins on a block 369 fast on a rod 371 adapted to slide longitudinally in upper extensions of the bearings 323 and 325, referred to. The clutch member 337 is connected to a yoke 373 having arms 375 receiving the rod 371. A coil spring 377 is confined between the block 369 and one of the arms 375, and a coil spring 379 is confined between said block and the other arm 375.

The construction is such that as the weighing receptacle is moved downward by the mechanism described, the tappet 355 will engage the rock lever 357, and the latter operating through the shaft 358, arm 357$^a$, rod 361, crank 363, and fork arms 365, will shift the block 369 to the right of Fig. 20, thereby compressing the spring 377. Continued movement of said block in this direction will cause a cam incline 381 on said block to engage a trigger 383 having a shoulder engaging one of the arms 375, and thereby allow the spring 377 to shift the clutch member 337 sharply to the right. This will interrupt the downward movement of the weighing receptacle and initiate the upward movement thereof.

As the weighing receptacle approaches the upward limit of its movement, the rollers 167 on the arms 165 will engage the fixed upper cams 169 and thereby rock the rods 159 and arms 157 and close the gates 155 of the weighing receptacle, so that the latter will be in readiness to receive the next charge of material to be fed thereto.

Next will be described suitable means for automatically arresting the upward feed of the weighing receptacle. This means, in the present instance, comprises a rock lever 385 (Fig. 12) fast on a shaft 386 journalled in brackets 387 carried by one of the cross bars 171 on the tower, said shaft having an arm 388 thereon connected by a rod 389 with an arm 390 fast on the rock shaft 358, referred to. The construction is such that as the weighing receptacle approaches its upward limit of movement, the tappet 355 will engage the rock lever 385, and the latter through the shaft 386, arm 388, rod 389, arms 390, shaft 358, lever 357$^a$ and rod 361, will rock the crank 363, shaft 364 and forked arm 365 in a direction to shift the block 369 to the left of Fig. 20 sufficiently to disconnect the bevel pinion 319 from the shaft 321, but not connect the bevel pinion 317 with said shaft.

As stated the bevel pinion 317 is connected to the shaft 321 by shifting the clutch member 337 to the left at the same time the clutch member 125 is shifted to the left. To accomplish this the trigger 305 (Fig. 19) and the corresponding trigger 393 (Fig. 20) may be fast on a cross rock shaft 394 (Fig. 17). The construction is such that the spring 379 is energized when the clutch member 337 is shifted to arrest the up movement of the weighing receptacle, but does not become effective to shift the clutch member 337 to connect the bevel gear 317 with the shaft 321 until the trigger 393 is tripped with the trigger 305.

Having described the feed of a predetermined charge of material from the feed tubes into the weighing receptacle, and the discharge of the same into a bag at the filling station, next will be described means for automatically causing the bag carrier to travel to convey the bag thus filled to the capping station. To accomplish this, one of the shafts 15, referred to, for the sprocket wheels of the bag carrier is provided with a gear 395 (Figs. 3 and 6) fast thereon meshing with a small gear 397 above the same on a stud shaft 399 mounted on one of the frames 3, referred to, said shaft having a bevel gear 401 fast thereon meshing with a bevel gear 403 fast on a vertical stub shaft which also has a bevel gear 405 thereon meshing with a bevel gear 130

407 on one end of a horizontal shaft 409 projecting into and journalled in a bearing in the clutch and gear box 105, so that said shaft is in alignment with the shaft 321 in said box.

To rotate the shaft 409 to feed the bag carrier at the times required, suitable clutch means may be provided, in the present instance, comprising a toothed member 411 fast on the shaft 321 and a companion member 413 fast on the shaft 409, and carrying a pin 415 urged by a spring 417 to the left of Fig. 20 to engage one of the spaces between teeth of the toothed member 411. The spring-pressed pin 415 is normally held in retracted position so that it does not connect the members 411 and 413, by a latch 419 (Figs. 18 and 20) slidable in a boss 421 in the box 105, and urged upward by a coil spring 423 in said boss. The latch 419 is connected by a yoke 425 with one arm of a bell-crank 427 fulcrumed on a pin 429 in the box 105. Co-operating with this bell-crank is a dog 431 mounted in a slot in the rod 371, referred to, and fulcrumed on a pin 433. This dog is yieldingly sustained in the path of the bell-crank 427 by a leaf spring 435 secured to said rod.

The construction is such that when the rod 371 is shifted to the right of Fig. 20, the dog 431 will wipe idly past the bell-crank, but when the rod 371 is shifted to the left of Fig. 20, the dog 431 will engage the bell-crank and rock the latter and cause the yoke 425 to depress the latch 419 and allow the spring-pressed pin 415 to connect the members 411 and 413, (Fig. 18ᵃ) thereby causing the shaft 321 to drive the shaft 409 and feed the bag carrier.

It is desirable that the bag carrier should travel a predetermined distance sufficient to convey a bag from the filling station to the capping station, this travel in the present instance being obtained on one complete rotation of the gear 397. To automatically arrest the carrier after it has been fed this distance, the spring pressed pin 415 (Figs. 18ᵃ, 18ᵇ and 20) is provided with a groove 415ᵃ receiving the latch and having a cam face 415ᵇ, the construction being such that on initial rotation of the clutch member 413 the pin 415 will be carried past the stationary latch and allow the latter to snap into an annular groove 415ᶜ in the clutch member 413, so that when the pin 415 is brought around again to the latch its cam face 415ᵇ will wipe against a cam face 415ᵈ (Fig. 18ᶜ) on the latch and thereby retract the pin and disconnect the clutch members.

When the weighing receptacle has reached its upper limit of travel, the clutch member 337 is shifted to the left of Fig. 20 to interrupt the upward feed, and in performing this operation, the rod 371 is shifted to the left of Fig. 20. As a consequence, the clutch connecting the shafts 321 and 409 for feeding the bag carrier will be closed concurrently with the arrest of the upward movement of the weighing receptacle.

Suitable means may be provided for automatically opening the gates 239 for the feed tubes as the bag just filled at the filling station approaches the capping station and an empty bag approaches the filling station. For this purpose, in the present instance, each bag holder is provided with a lug 437 (Figs. 1 and 15) having an end 439 adapted to engage an arm 441 fast on the rock shaft 285, referred to, operatively connected with the toggle in the toggle box 233. The construction is such that as a bag holder containing an empty bag approaches the filling station, the lug end 439 on the holder will engage the arm 441 and rock the same to the left of Fig. 15, thereby rocking the arm 283 and the link 381 to the right and straightening the toggle links 273 and 275. This will force down the block 277 connected to the plunger 263, compress the coil spring 269 and through the connections from said plunger to the gates for the feed tubes, will open the said gates.

Since the crank 151 on the clutch and gear box 105 is operatively connected with the connections for controlling the gates of the feed tubes, this crank will be rocked in a direction to cause the clutch member 125 to connect the sleeve shaft 115 with the main shaft 119, thereby starting the rotation of the feed screws concurrently with the opening of the gates for the feed tubes. This movement of the clutch member 125 will automatically disconnect the sleeve shaft 331 from the main shaft, thereby arresting the shaft 321. The weighing receptacle will move downward from the weight of the material fed therein until a charge of predetermined weight has entered said receptacle, when it is automatically arrested as described.

Suitable means may be provided for supplying and applying caps to the top of the charge of material in the bag. For this purpose, in the present instance of the invention, a stack holder 443 (Figs. 1, 3, 21 and 25) is provided supported on one of the frames 3 of the machine. A supply of caps which may be of paper or other suitable material are stacked in the holder 443, as will be noted in Fig. 25. Suitable means may be provided for automatically elevating the stack of caps an increment equal to the thickness of one of the caps each time a cap is transferred from the stack to a bag. To this end an elevator 445 may be mounted in the stack holder and guided by the walls thereof. Opposed ends of the elevator have lugs 447 connected to sprocket chains 449 passing around upper sprocket wheels 451 on shafts 453 journalled in bearings in brackets 455 (Fig. 26) mounted on the stack holder. To rotate the sprocket chains 449 together, suitable transmission means may be provided between said chains, in the present instance, in the form of bevel gears 457 fast on the shafts 453 and meshing with bevel gears 459 fast on a cross shaft 461 journalled in brackets 463 mounted on the stack holder. The sprocket chains also pass around lower sprocket wheels 465 on shafts 467 journalled in bearings in brackets 469 mounted on the stack holder.

To drive the sprocket chains, one of the shafts 467 may have a worm wheel 471 fast thereon driven by a worm 473 on a shaft 475 having a sprocket wheel 477 thereon connected by a sprocket chain 479 with a sprocket wheel 481 (Figs. 3 and 23) fast on a shaft 485 journalled in bearings in brackets 487 and 489 carried by the upper horizontal frame 9, referred to.

In alignment with the shaft 485 is a shaft 491 journalled in a bearing in a bracket 493 carried by the upper horizontal frame, said shaft having a pulley 495 fast thereon connected by a belt 497 with a pulley 499 (Figs. 1 and 20) fast on the shaft 321 in the clutch and gear box 105. The construction is such that the pulley 495 is rotated continuously so long as the clutch member 125 connects the sleeve shaft 331 with the main shaft 119.

The shafts 485 and 491 may be connected at the times required by suitable clutch means, which may conveniently be similar to the clutch means described for connecting the shaft 321 with the shaft 409 for rotating the feed screws. This clutch means comprises a toothed member 501 fast on the shaft 491, and a member 503 fast on the shaft 485. A spring-pressed pin similar to the pin 415, referred to, is mounted in the member 503, but is restrained from moving into a toothed space of the member 501 by a latch 509 (Fig. 22) on the lower end of a pin 511 adapted to slide in boss 513 in a bracket 515 mounted on the bracket 489 referred to. Pins 517 on the pin 511 are received by forks of an arm 519 mounted on a shaft 521 carried by the bracket 515. Also fast on the shaft 521 is an arm 523 cooperating with an arm 525 (Figs. 22 and 24) fast on a shaft 527 mounted in bearings 529 and 531, the former on the bracket 489, and the latter on the upper horizontal frame 9. The arm 525 has a finger 533 pivoted thereon and normally pressed by a leaf spring 535 against a shoulder 537 on said arm. The construction is such that when the arm 525 is rocked to the left of Fig. 22, the finger 533 will wipe past the arm 523 without moving the latter, but when the arm 525 is rocked toward the right, the finger 533 will engage the shoulder 537 and become effective to rock the arm 523 and the arm 519 in a direction to withdraw the latch 509 away from the pin, thereby allowing said pin to connect the clutch members 501 and 503 to cause said shafts to rotate together. The arm 519 may be normally urged to press the latch 509 in a direction to hold the pin retracted by a coil spring 539 having one end connected to the arm 519 and its opposite end connected to the bracket 515.

Suitable means may be provided for automatically connecting said clutch member at the times required. To accomplish this, in the present instance, an arm 541 is secured to the shaft 527, and connected by a rod 543 (Figs. 12 and 21) with an arm 545 connected to the shaft on which the rock lever 257 is mounted. The construction is such that when the toggle links are straightened and the plunger 263 is depressed to open the gates for the feed tubes and to rotate the feed screws, the clutch members 501 and 503 will be connected and cause rotation of the shaft 485, and the latter in turn through the sprocket wheel 481, sprocket chain 479 and sprocket wheel 407 will rotate the worm 473. This worm should be given one complete rotation which is sufficient for lifting the elevator 445 an increment equal to the thickness of one of the caps. The pin may have a groove with a cam face similar to the groove 415a and cam face 415b referred to, for engagement with the latch 509 for automatically retracting the pin 505 and disconnecting the clutch members when the shaft 485 has received one complete rotation. Thus, the worm 473 will be arrested after receiving one complete rotation.

Having described the stack holder for the caps and the means for elevating the stack of caps an increment after a cap has been removed therefrom, next will be described means for transferring the uppermost cap on the stack to the bag containing a charge of material at the capping station. To accomplish this, in the present instance, a hollow suction head 549 (Figs. 21, 25 and 26) may be provided having a perforated plate 551 adapted to engage the cap at the top of the stack, the construction being such that when suction effect is produced in the head, a cap may be picked from the stack thereby.

Figure 5:
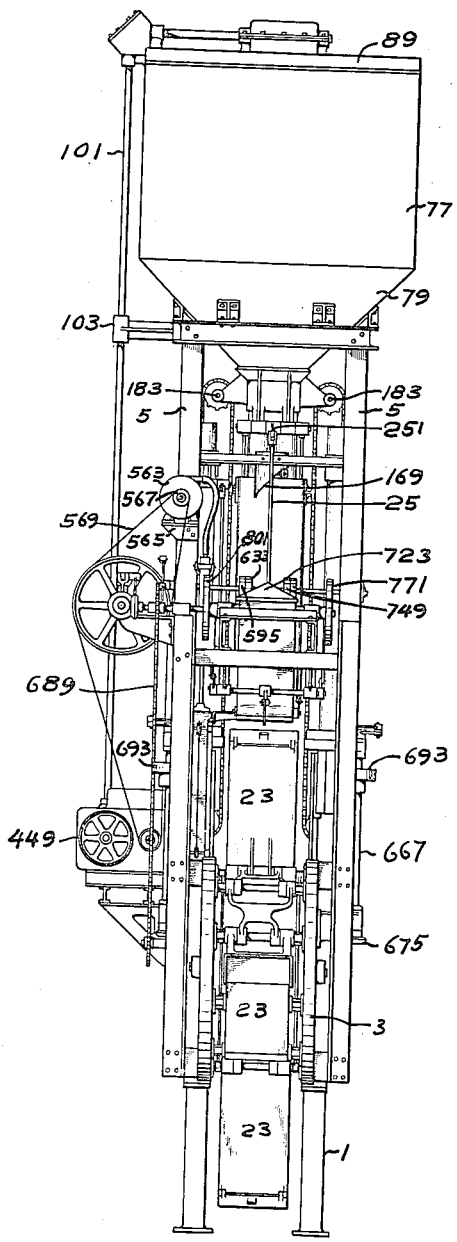
Fig. 5 is an end elevation of the machine looking toward the right of Fig. 1.

Suitable means may be provided for moving the head from the stack to the bag. This means, in the present instance, comprises a carrier in the form of a pipe 553 having one end connected to said head, and its opposite end connected to a cylinder 555 (Fig. 21) mounted in a sleeve 557 journalled in a bearing 559 in one of the upper horizontal frames 9, said sleeve being confined against axial movement in said bearing while free to rotate therein. The upper end of the cylinder 555 may be connected by a pipe 561 with a suitable section device, in the present instance, in the form of a fan 563 (Figs. 1 and 5) of usual construction mounted on a bracket 565 carried by the tower. This fan has a shaft provided with a pulley 567 adapted to be driven by a belt 569 from a larger pulley 571 mounted on the shaft 491, referred to. The construction is such that suction effect is maintained by the fan in the head 549 for enabling the head to pick up a cap and transfer the same as required.

Suitable means may be provided for swinging the head from the cap stack to the bag at the capping station. To accomplish this, in the present instance, the sleeve 557 is provided at the upper end thereof with a spiral toothed segment 573 (Figs. 21 and 23) meshing with a spiral toothed segment 575 fast on a stub shaft 577 journalled in a bearing 579 mounted on one of the upper horizontal frames 9. This stub shaft has a pinion 581 fast thereon meshing with a toothed segment 583 carried by a boss 584 loose on a shaft 585 mounted in bearings 587 and 589 on the upper horizontal frame. The boss 584 has an arm 591 fast thereon carrying a follower 593 working in a cam 595 fast on a shaft 597 journalled in bearings 599 and 601 mounted on the upper horizontal frame. This shaft has a bevel gear 603 at one end thereof meshing with a bevel gear 605 on one end of the shaft 485 which is adapted to receive one complete rotation when the clutch members 501 and 503 are connected as described.

The construction is such that the cam 595 will receive one complete rotation, and in the course thereof through the gearing described, will rotate the sleeve 557 through an arc sufficient to transfer the suction head and a cap from the cap stack to the bag at the capping station. The cylinder 555 connected to the pipe carrier 553 is caused to rotate with the cylinder 557 by a pin 607 projecting from the cylinder into an elongated slot 609 in the sleeve.

After the suction head and cap have been rocked to present the cap above the bag, it is desirable that the head and cap shall be lowered to place the cap on top of the charge in the bag. To accomplish this, in the present instance, the cylinder 555 is provided with a ring 611 loose thereon receiving forks 613 on an arm 615 (Figs. 21 and 23) fast on a stub shaft 617 journalled in a bearing 619 mounted on one of the upper horizontal frames 9. Also fast on said stub shaft is an arm 621 connected by a link 623 with an arm 625 projecting from a boss 627 loose on the shaft 585, referred to. An arm 629 projects from said boss and carries a follower 631 working in a cam 633 mounted on the shaft 597, referred to.

The construction is such that in the course of one complete rotation of the shaft 597 and the cam 633 through the connections described, the cylinder 555 is rocked downward to lower the suction head and cap sufficiently to place the cap on top of the charge in the bag.

The upper surface of each cap may receive an adhesive coating such that when moistened it will stick to upper portions of the bag folded over onto the same, as more fully hereinafter described. Suitable moistening means may be provided for this purpose, in the present instance, comprising two moistening devices which will moisten two zones at opposite sides of the cap, leaving an unmoistened zone between them. Each of these moistening devices may comprise a trough 635 (Figs. 21, 26, 27, 28 and 29) carried by a bracket 637 secured to a table 639 mounted adjacent the top of the cap stack holder, said trough being adapted to receive a supply of water. To conduct the water from the trough to the cap, a wick 641 may be provided wrapped about the outer surface of the trough and having end portions projecting downward into the water in the trough. To yieldingly support the trough it may have bosses 645 fast thereon receiving pins 647 secured to said bosses and projecting upward through bosses in an extension 649 of the bracket 637. Coil springs 651 confined between the upper ends of said bosses and said bracket extension, serve to press the trough downward until limited by engagement of thumb nuts 653 on said pins with said extension. The table 639 may have an opening 655 therein beneath the troughs, so that any drippings from the wick and any excess moisture applied to the cap may be wiped therefrom over the edge thereof and escape through said opening.

The table 639 is located in the path of the suction head, so that when the latter moves from the cap stack to the bag, the cap carried by the head will be slid over the table beneath the moistening devices and be moistened thereby. The spaced relation of the moistening devices allows the suction head and carrier to readily pass between them.

After a cap has been transferred to the top of the charge in the bag, it is desirable that opposed upper end portions of the bag shall be folded over against the moistened gummed surfaces of the cap and be pressed into adhesive engagement therewith. To accomplish this, in the present instance, a pair of folding slides 657 (Figs. 34 and 35) may be provided adapted to slide horizontally in guides 659 on carriers 661, said slides being connected by links 663 with cranks 665 at the upper ends of vertical shafts 667 journalled in upper bearings 669 in said carriers, and in lower bearings 671 in brackets 673 mounted on the frames 3 of the machine. The lower ends of the vertical shafts have bevel gears 675 fast thereon meshing with bevel gears 677 fast on a cross shaft 679 journalled in a bearing 681 in the bracket 673 and in a bearing 683 in a bracket 685 secured to one of the frames 3. The shaft 679 is driven by a sprocket wheel 687 fast on one end thereof (Figs. 3 and 35) connected by a sprocket chain 689 with a sprocket wheel 691 (Fig. 23) fast on the shaft 597, referred to.

The construction is such that in the course of one rotation of the shaft 597, through the gearing described, the folding slides 657 are caused to move inward toward one another to their positions shown in Figs. 34 and 35. In the course of this movement they will engage upper side portions of the bag and fold the same inward down onto the moistened gummed portions of the cap.

It is desirable that after these portions have been folded in as described, they shall be pressed downward against said cap to insure adhesive engagement therewith. To accomplish this, in the present instance, cams 693 (Figs. 34 and 35) are mounted fast on the vertical shafts 667 and engage rollers 69 on the carriers 661, the construction being such that in the course of the rotation of these cams, the carriers will be adjusted downward somewhat to press the folded over portions of the bag against the cap. To guide the carriers 661 in their up and down movements, they may have dovetailed grooves 699 therein receiving dovetailed projections 701 projecting from uprights 703 mounted on the frames 3 of the machine at the capping station.

It is desirable that the slides shall be yieldingly pressed against the cap on the charge in a bag. To accomplish this, the rollers 695 are not directly connected to the carriers 661, but are mounted on small dovetail slides 705 (Fig. 36) working in dovetail grooves 707 in said carriers. The downward pressure is transmitted from the small slides through coil springs 709 confined between shoulders 711 on the small slides, and collars 713 on pins 715 having end portions 717 in bores in the upper ends of the small slides and having portions 719 threaded to lugs 721 on the carriers. These pins may be adjusted in said lugs to vary the tension of said springs as required. When the slides 657 are pressed downward as described, they will release the cap from the suction head. Then the slides are retracted outwardly and the bag is in readiness to be transferred to the next station for receiving the final folding operations on the upper portions of the bag. It will be understood that each time the bag carrier is fed a step, an empty bag is conveyed to the filling station, a filled bag is conveyed to the capping station, and a bag with a cap thereon is fed to the final folding and sealing station.

Next will be described means for applying a waterproof adhesive, such, for example, as black asphaltum or other suitable adhesive to the outer surfaces of the opposed upper portions of the bag which have been folded over onto the cap as described. To accomplish this, in the present instance, a tank 723 (Figs. 3, 21 and 23) may be mounted on the upper horizontal frame 9, and may be provided with a cover 725 and a tapered bottom 727 provided with a pair of elongated outlets 729. These outlets may be provided with rotary valves 731 having suitable operating means therefor to allow the adhesive to pass through one of said outlets and then through the other outlet onto the upper surfaces of portions of the bag which have been folded over. This operating means, in the present instance, comprises arms 733 connected to said rotary valves, said arms in turn being connected by links 735 with arms 737 on bosses 739 (Fig. 23) loose on a shaft 741 mounted in bearings 743 on the upper horizontal frame. These bosses have arms 745 projecting therefrom carrying a follower 747 working in cams 749 fast on the shaft 597, referred to.

The construction is such that in the course of a single rotation of the shaft 597, the cams through the connections described will open first one of the valves 731 and then the other to admit a predetermined quantity of the adhesive to pass through the outlets 729 onto the opposed folded over portions of the bag. After the waterproof or other adhesive has been fed through one of the outlets 729, it is desirable that the adjacent upper portions of the bag shall be folded down onto the previously folded opposed portions of the bag and into adhesive engagement therewith. To accomplish this, one of the cover sections 49, referred to, of the bag holder is folded from its full line position to its dotted line position, as shown in Fig. 21. The means for rocking the cover section as described, in the present instance, comprises a finger 751 (Fig. 21) pivotally connected to an arm 753 fast on a shaft 755 journalled in bearings in brackets 757 depending from the upper horizontal frame. An arm 759 fast on the shaft 755 is connected by a link 761 with an arm 763 projecting from a boss 765 loose on the shaft 741 referred to. Also projecting through said boss is an arm 767 carrying a follower 769 working in a cam 771 fast on the shaft 597. The construction is such that in the course of a single rotation of the shaft 597, the cam 771 through the means described, will rock the finger 751 and cause the same to engage a lug 773 (Figs. 21 and 30) on one of the cover sections and rock said section from its full line to its dotted line position shown in Fig. 21, thereby folding the portion of the bag thereat down onto and into adhesive engagement with the cap and then the cam 771 allows the cover section to return to its full position. To insure continued engagement of the finger 751 with the lug 773 during these operations, said finger is provided with a coil spring 775 having one end connected to the arm 753 and the other end connected with a spur 777 on said finger adapted to engage and be limited by a stop 779 on the arm 753.

After the upper portion of the bag has been folded over as just described, the waterproof adhesive is applied thereto through the other outlet 729 and both cover sections are rocked down, thereby folding the opposite portion of the bag down onto the adhesive coating which has been applied to the previously folded portions of the bag. The means for rocking one cover section has been described. The means for rocking the other cover section, in the present instance, comprises a finger 781 (Fig. 21) pivotally connected to an arm 783 fast on a shaft 785 journalled in bearings in a bracket 787 depending from the upper horizontal frame. An arm 789 fast on said shaft is connected by a link 791 with an arm 793 projecting from a boss 795 loose on the shaft 741, referred to. Also projecting from said boss is an arm 797 carrying a follower 799 working in a cam 801 fast on the shaft 597, referred to.

The construction is such that in a single rotation of the shaft 597, the cam 801 through the means described, will rock the finger 781 downward and cause the same to engage a lug 803 (Figs. 21 and 30) and rock the lever section downward and fold the portion of the bag thereat down onto the cap. This completes the folding over of the opposed upper portions of the bag at the ends and sides thereof.

It is desirable that the cover sections 49 shall be held in the positions to which they have been rocked, in order to hold the portions of the bag folded thereby against the waterproof adhesive sufficiently long for said adhesive to set. The cover sections are automatically locked in this position by the latches 61, referred to, which snap into the slots 63 of the lugs 65, as shown in Fig. 30.

After the bag has been sealed as described, it is conveyed by the bag carrier to the discharge end of the machine. In the course of its transit, the wall 31 of the bag holder will be rocked by the arm 37 and the camway 41 to its open position as shown in Figs. 1 and 7. This will withdraw the latches 61 from the slots 63 and allow the coil springs 57 to open the cover sections and permit the discharge of the bag therefrom.

The camways of the cams 595 and 633 for producing the transfer and axial movements of the device for transferring the caps from the cap stack to the bags; the camways of the cams 749 for controlling the valves 731 for admitting adhesive to opposed folded over upper end portions of the bag; and the camways of the cams 771 and 801 for controlling the rocking movements of the arms 753 and 783 co-operating with the cover sections 49 for folding over other opposed upper end portions of the bag, may all be of contours appropriate to produce the motions of said parts as hereinbefore described, and since the determination of the form of these camways is in the province of the designer rather than the inventor, it is deemed unnecessary to show details of said camways herein.

Figure 37:
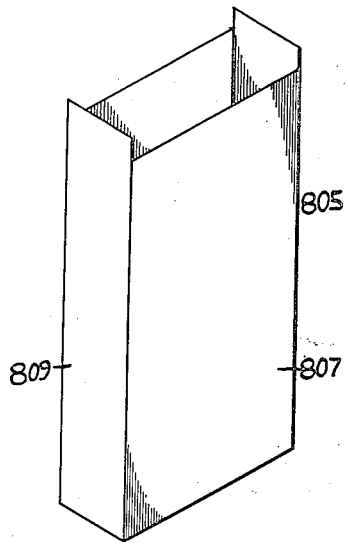
Figure 38:
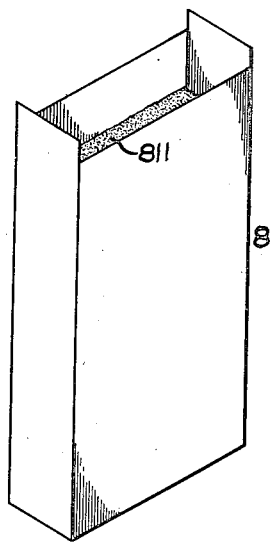
Figure 39:
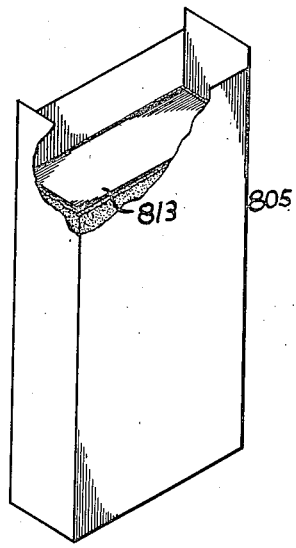
Figure 40:
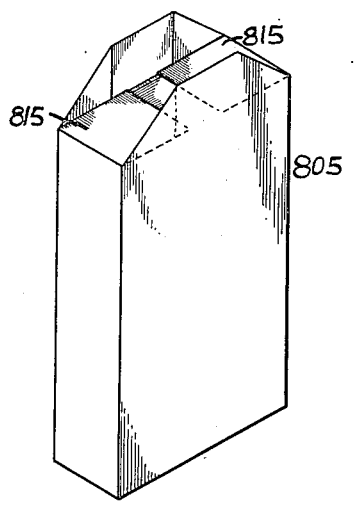
Figure 41:
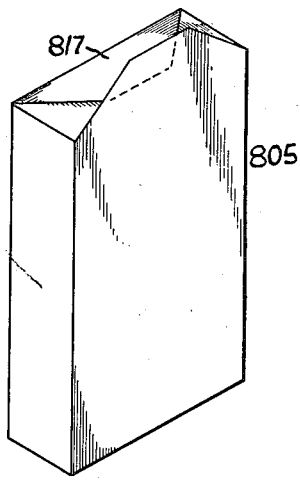
Figure 42:
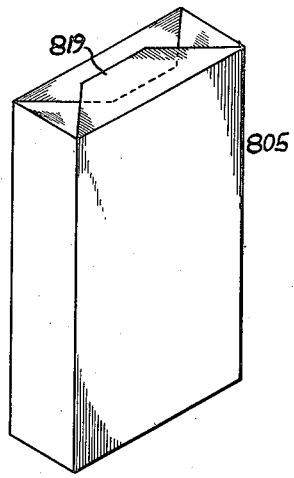

The type of bag or container to be employed in the machine, may obviously be varied as desired, and after introduction of a charge of material into the bag, the upper end thereof may be closed and secured or sealed as desired. However, for purpose of illustration in Figs. 37 to 42 inclusive, one good form of bag which may be used in the machine is shown, comprising a body 805 of paper or other suitable material of general rectangular form having opposed sides 807 and opposed ends 809. Fig. 37 shows the appearance of this bag when empty; Fig. 38 shows the appearance of the bag after a charge 811 of cement or other material has been introduced therein; Fig. 39 shows a cap 813 of paper or other suitable material which may be placed on top of the charge in the bag by the device for transferring the caps from the cap stack to the bag; Fig. 40 shows opposed upper end portions 815 of the bag which may be folded over onto the cap by the opposed folding slide members; Fig. 41 shows the appearance of the bag when the upper end portion 817 of one of the sides has been folded over onto the adhesive applied to the end portions 815; and Fig. 42 shows the appearance of the bag after the opposite side portion 819 has been folded over onto the adhesive applied to the portion 817.

The operation of the machine will be readily understood from the foregoing description without further elucidation thereof.

It will be understood that the invention is not limited to the specific embodiment shown, but that various deviations may be made therefrom without departing from the spirit and scope of the appended claims.

What is claimed is:—

1. A machine of the character described, comprising, in combination, means to introduce a charge of material into a container, means automatically to apply a cap to the charge in the container, and means automatically to secure the upper end portions of the container to the outer face of said cap to close the container.

2. A machine of the character described, comprising, in combination, means to introduce a charge of material into a bag, means automatically to transfer a cap from a source of supply to the charge in the bag, and means to fold over the upper end portions of the bag onto the cap and secure the same thereto to close the bag.

3. A machine of the character described comprising, in combination, a holder for a stack of caps, means to support a bag containing a charge of material adjacent said holder, means to transfer the top cap from said stack to the bag, an elevator supporting the stack, and power driven means for raising the elevator to lift the stack an increment each time a cap is transferred therefrom, said power driven means operable from a positively driven element of said machine.

4. A machine of the character described, comprising, in combination, a holder for a stack of caps, means to support a bag containing a charge of material adjacent said holder, means to transfer a cap from said stack to the bag, and means for rendering the upper surface of the cap adhesive in the course of its transfer from the stack to the bag.

5. A machine of the character described, comprising, in combination, a holder for a stack of caps having gummed faces, means to support a bag containing a charge of material adjacent said holder, means to transfer a cap from the stack to the bag, and means automatically to moisten the gummed face of the cap as it is transferred from the stack to the bag.

6. A machine of the character described, comprising, in combination, a holder for a stack of caps having gummed faces, means to support a bag containing a charge of material adjacent said holder, a table between said stack holder and said bag, means to pick up a cap from said stack and slide the same over said table to said bag, and means for moistening the gummed face of the cap as it passes over said table.

7. A machine of the character described, comprising, in combination, a holder for a stack of caps having gummed faces, means to support a bag containing a charge of material adjacent said holder, means to transfer a cap from said stack to the bag, and means to moisten zones of the gummed face of the cap as it is transferred from the stack to the bag.

8. A machine of the character described, comprising, in combination, means to support a supply of caps, means to support a bag containing a charge of material adjacent said cap support, means automatically to transfer a cap from said supply to the bag, means automatically to render the upper face of said cap adhesive, and means automatically to fold upper end portions of the bag into adhesive engagement with said cap.

9. A machine of the character described comprising, in combination, a holder for a bag having spaced side walls positioned to receive a bag therebetween, said walls having their upper ends substantially flush with the upper folded end of the bag, cover sections pivotally mounted upon the upper ends of said walls and positioned to fold downwardly about their pivots and towards each other to impart a similar folding movement to upwardly extending portions of the bag, and means for automatically moving said sections to the folded position.

10. A machine of the character described, comprising, in combination, means to support a bag containing a charge of material, means to support a supply of caps adjacent said bag support, means to transfer a cap from said supply to said bag, folding members mounted adjacent the upper end of the bag, operating means for said members to cause the same to fold portions of the bag over against the cap, and means yieldingly to press said members downward to press the folded over portions against the cap, said last-mentioned means operable to disengage the cap from the cap transfer means.

11. A machine of the character described, comprising, in combination, means to introduce a charge of material into a bag, a holder for the bag having oppositely disposed cover sections hinged thereto, means co-operating with said cover sections to swing the same toward each other and thereby fold inward the upper end portions of the bag, and means automatically to secure said cover sections to each other in closed position on operation thereof to close the bag.

12. A machine of the character described, comprising, in combination, means to introduce a charge of material into a bag, a holder for the bag having hinged cover sections, spring means tending to open said sections, means co-operating with said sections to close the upper end of the bag, and latch means for automatically securing said sections in closed position.

13. A machine of the character described, comprising, in combination, means to introduce a charge of material into a bag, a holder for the bag having fixed and movable walls, cover sections hinged respectively to said fixed and movable walls, means co-operating with said cover sections to close the upper end of the bag, means automatically to lock said cover sections in closed position, and means automatically to open the movable side of the holder, release said locking means, and allow said cover sections to open to discharge the bag.

14. A machine of the character described, comprising, in combination, means to introduce a charge of material into a bag, means to apply a cap to the charge in the bag, means to close the upper end of the bag over on said cap, and means to secure said end to said cap.

15. A machine of the character described, comprising, in combination, a station having means automatically to introduce a charge of material into a bag, a station having means to moisten the gummed face of a cap, means to apply the cap to the bag and means to fold over upper portions of the bag onto said cap, a station having means to fold over other portions of the bag and seal the same with the portions first folded, and means automatically to convey the bag successively to said stations.

16. A machine of the character described, comprising, in combination, a station having means for automatically introducing a charge of material into a bag, a station having means to automatically moisten the gummed face of a cap and apply the cap to the charge in the bag, a station having means for automatically closing the upper end of the bag over said cap, and means concurrently to operate the means at said stations.

17. A machine of the character described, comprising, in combination, a station havinging means for automatically introducing a charge of material into a bag, a station having means to apply a cap to the top of the charge in the bag, a station having means for closing and securing the upper end of the bag, and operating means for the cap applying means and closing and securing means including a rotary driving member and clutch means for automatically imparting a rotary movement of predetermined duration to said driving member.

18. A machine of the character described, comprising, in combination, a station having means for introducing a charge of material into a bag, a station having means for closing and securing the upper end of the bag, a holder for the bag, a carrier for conveying the holder successively to said stations, driving mechanisms for said carrier, and means including an electric circuit automatically to render the driving mechanism effective to convey the holder from the first station to the second station on introduction of a charge into the bag at the first station, said last mentioned means controlled by the weight of the charge of material for the bag.

19. A machine of the character described, comprising, in combination, a station having means for automatically introducing a charge of material into a bag, a station having means for automatically folding and securing the upper end of the bag, a holder for the bag, a carrier for the holder, and driving means for the carrier, including a clutch for rendering the driving means effective, and means automatically to operate said clutch to transfer the holder from the first station to the second station after introduction of the charge into the bag at the first station, said last mentioned means controlled by the weight of the charge of material for the bag.

20. A machine of the character described comprising, in combination, means for introducing a charge of material into a bag, a holder for a bag having a side hinged thereto, a carrier for conveying the bag holder from a bag-receiving position to the bag-charging means and then to a bag-delivery position, means operable by the movement of said carrier for positively holding said hinged side in an open position while the holder occupies the bag-receiving and bag-delivery positions, and operable to positively hold the side closed while the holder is in the bag-filling position.

21. A machine of the character described, comprising, in combination, means for introducing a charge of material into a bag, a holder for a bag having a side hinged thereto, a carrier for conveying the bag holder from a bag-receiving position to the bag-charging means and then to a bag-delivery position, said side provided with an operating arm, and a guide cooperating with said arm and constructed to positively hold said side in an open position while the holder occupies the bag-receiving and bag-delivery positions and to positively hold the side in its closed position while the holder is in the bag-filling position.

22. A machine of the character described, comprising in combination, a station having means for introducing a charge of material into a bag, a station having means for closing the upper end of the bag, a holder for a bag having a side hinged thereto, a carrier for conveying the bag to said stations, and means operable by the movement of said carrier to positively move said hinged side into and out of its closed position.

23. A machine of the character described, comprising in combination, a station having means for introducing a charge of material into a bag, a station having means for closing the upper end of the bag, a holder for a bag having a side hinged thereto, bag closing sections pivotally secured to said holder, means for securing said sections in their closed position, a carrier for conveying the bag to said stations, and means operable by the movement of said carrier to positively move said side to its open position and to simultaneously release the sections.

24. A machine of the character described, comprising in combination, a station having means for introducing a charge of material into a bag, a station having means for closing the upper end of the bag, a holder for a bag having a side hinged thereto, a carrier for conveying the bag to said stations, a fixed guide, and an arm connected to said hinged side, said arm constructed to engage the fixed guide and to be operated by its movement relative to the guide to move said side to and from its closed position.

25. A machine of the character described, comprising, in combination, a holder for a stack of caps, means to support a bag containing a charge of material adjacent said holder, suction means for transferring the top cap from said stack to the bag, and means to fold the upper end portions of the bag over against the cap, said folding means operable to strip the cap from the suction means.

26. A machine of the character described, comprising, in combination, a holder for a stack of caps, means to support a bag containing a charge of material adjacent said holder, suction means for transferring the top cap from said stack to the bag, and means to fold the upper end portions of the bag over and yieldingly force said folded end portions down upon the cap, said last-mentioned means operable to strip the cap from the suction means.

27. A machine of the character described, comprising, in combination, a holder for a bag having cover sections hinged thereto adjacent the end of the bag to be folded, spring means tending to open said sections, means for folding said sections inward toward each other for automatically folding over upper end portions of the bag to close the same, and latch means for retaining the sections in their folded position.

28. A machine of the character described, comprising in combination, a holder for a bag having a bag-enclosing wall of substantially the height of the closed bag, cover sections hinged to the outer end of the holder adjacent the end portions of the bag to be folded, means cooperating with said sections to fold the same and thereby fold the end portions of the bag to be closed, spring means tending to open said sections, and means for securing said sections in their closed position.

29. A machine of the character described, comprising in combination, a station having means for introducing a charge of material into a bag, a station having means for closing and securing the upper end of the bag, a holder for the bag, a carrier for conveying the holder successively to said stations, driving means for advancing the carrier a predetermined distance, said driving means controlled by the weight of the charge of material for the bag.

30. A machine of the character described, comprising, in combination, means to support a bag containing a charge of materials, folding members, means for swinging said folding members downward to fold upper end portions of the bag over toward the charge in the bag, and interengaging means upon said folding members for retaining the latter in the folded position.

31. A machine of the character described, comprising, in combination, means to support a bag containing a charge of materials, means for placing a cap in the upper end of said bag and upon the charge therein, folding members, means for swinging said folding members downward to fold upper end portions of the bag over into engagement with said cap, and interengaging means upon said folding members for retaining the latter in the folded position to hold said upper end portions in engagement with said cap.

In testimony whereof, I have signed my name to this specification.

CHARLES H. HOWARD.